(12) United States Patent
Theis et al.

(10) Patent No.: US 10,095,672 B2
(45) Date of Patent: Oct. 9, 2018

(54) METHOD AND APPARATUS FOR SYNCHRONIZING FINANCIAL REPORTING DATA

(71) Applicant: Novaworks, LLC, Rochester, NY (US)

(72) Inventors: Scott A. Theis, West Henrietta, NY (US); David S. Theis, West Henrietta, NY (US); Erin M. Rybinski, West Henrietta, NY (US)

(73) Assignee: Novaworks, LLC, Rochester, NY (US)

( * ) Notice: Subject to any disclaimer, the term of this patent is extended or adjusted under 35 U.S.C. 154(b) by 667 days.

(21) Appl. No.: 13/920,743

(22) Filed: Jun. 18, 2013

(65) Prior Publication Data
US 2014/0013204 A1    Jan. 9, 2014

Related U.S. Application Data

(60) Provisional application No. 61/661,061, filed on Jun. 18, 2012.

(51) Int. Cl.
*G06F 17/24* (2006.01)
*G06F 17/22* (2006.01)
*G06Q 40/00* (2012.01)

(52) U.S. Cl.
CPC ......... *G06F 17/24* (2013.01); *G06F 17/2235* (2013.01); *G06F 17/243* (2013.01); *G06Q 40/12* (2013.12)

(58) Field of Classification Search
CPC .................................................... G06F 17/24
See application file for complete search history.

(56) References Cited

U.S. PATENT DOCUMENTS

| | | | | |
|---|---|---|---|---|
| 5,481,722 A * | 1/1996 | Skinner | ..................... | G06F 8/71 717/122 |
| 6,912,529 B1 * | 6/2005 | Kolfman | ............. | G06F 17/2205 |
| 6,968,316 B1 * | 11/2005 | Hamilton | ............... | G06Q 40/02 705/36 R |
| 7,003,489 B1 * | 2/2006 | Dixon, III | ............. | G06Q 40/00 382/173 |
| 7,305,420 B2 * | 12/2007 | Mathias | ........... | G06F 17/30179 |
| 7,366,714 B2 * | 4/2008 | Krachman | ............. | G06Q 50/16 |
| 7,849,030 B2 * | 12/2010 | Ellingsworth | .... | G06F 17/30707 706/20 |
| 7,856,388 B1 * | 12/2010 | Srivastava | ........ | G06F 17/30569 705/35 |

(Continued)

FOREIGN PATENT DOCUMENTS

WO    WO-2010111328 A1 *    9/2010    ............. G06Q 10/06

*Primary Examiner* — Scott T Baderman
*Assistant Examiner* — Sookil J Lee
(74) *Attorney, Agent, or Firm* — Barclay Damon LLP

(57) ABSTRACT

A method and apparatus accurately synchronizes one or more items of financial information between a plurality of representations, or presentations, of marked up financial data stored in electronic form. The different representations may include balance sheets, income statements, and cash flow statements, among various other financial data, that may share common financial facts that are presented in a selected reporting format corresponding to the representations. Identifiers are assigned to the data so that instances of the facts may be automatically and simultaneously updated throughout the different representations each time a fact is updated in one representation.

36 Claims, 14 Drawing Sheets

(56) References Cited

U.S. PATENT DOCUMENTS

| | | | | |
|---|---|---|---|---|
| 8,706,705 | B1* | 4/2014 | Warrington | G06F 17/3023 707/695 |
| 8,825,614 | B1* | 9/2014 | Haila | G06F 17/2288 707/695 |
| 2003/0041077 | A1* | 2/2003 | Davis | G06F 17/2247 715/205 |
| 2003/0198850 | A1* | 10/2003 | Suzuki | G06F 17/30011 429/524 |
| 2004/0010523 | A1* | 1/2004 | Wu | G06F 17/30578 |
| 2004/0153576 | A1* | 8/2004 | Hansmann | G06F 17/30902 709/248 |
| 2005/0223325 | A1* | 10/2005 | Naitou | G06F 17/2247 715/255 |
| 2005/0246269 | A1* | 11/2005 | Smith | G06Q 20/10 705/39 |
| 2006/0036527 | A1* | 2/2006 | Tinnirello | G06Q 10/087 705/35 |
| 2006/0106746 | A1* | 5/2006 | Stuhec | G06F 17/30569 |
| 2006/0230025 | A1* | 10/2006 | Baelen | G06F 17/2247 |
| 2006/0235831 | A1* | 10/2006 | Adinolfi | G06Q 40/00 |
| 2006/0242180 | A1* | 10/2006 | Graf | G06F 17/30917 |
| 2006/0259524 | A1* | 11/2006 | Horton | G06F 17/24 |
| 2007/0055596 | A1* | 3/2007 | Yankovich | G06Q 40/02 705/35 |
| 2007/0078877 | A1* | 4/2007 | Ungar | G06F 17/2247 |
| 2007/0078941 | A1* | 4/2007 | Dun | G06F 17/30575 709/217 |
| 2007/0174100 | A1* | 7/2007 | Roy | G06Q 10/06 705/7.12 |
| 2007/0244775 | A1* | 10/2007 | Linder | G06Q 40/00 705/35 |
| 2007/0288336 | A1* | 12/2007 | Malaviya | G06Q 40/00 705/35 |
| 2008/0250070 | A1* | 10/2008 | Abdulla | G06F 19/3406 |
| 2008/0250157 | A1* | 10/2008 | Ohata | G06Q 10/10 709/236 |
| 2008/0270765 | A1* | 10/2008 | Naitou | G06F 17/211 712/220 |
| 2009/0006472 | A1* | 1/2009 | Bush | G06F 17/2247 |
| 2009/0019358 | A1* | 1/2009 | Blake | G06F 17/2247 715/234 |
| 2009/0248490 | A1* | 10/2009 | Moncreiff | G06Q 10/0637 705/7.34 |
| 2009/0300482 | A1* | 12/2009 | Summers | G06F 17/30926 715/234 |
| 2010/0070470 | A1* | 3/2010 | Milencovici | G06F 17/30578 707/610 |
| 2010/0076977 | A1* | 3/2010 | Wyatt | G06F 17/30592 707/737 |
| 2010/0332360 | A1* | 12/2010 | Nowotny | G06Q 10/10 705/30 |
| 2011/0035408 | A1* | 2/2011 | Hotz | G06Q 10/06 707/770 |
| 2011/0137923 | A1* | 6/2011 | Koroteyev | G06F 17/2247 707/756 |
| 2011/0208623 | A1* | 8/2011 | Tandon | G06Q 20/10 705/30 |
| 2011/0231384 | A1* | 9/2011 | Koroteyev | G06F 17/30734 707/709 |
| 2011/0264625 | A1* | 10/2011 | Samudrala | G06F 17/30557 707/624 |
| 2012/0197836 | A1* | 8/2012 | Meeks | G06N 5/025 706/59 |
| 2013/0124523 | A1* | 5/2013 | Rogers | G06F 19/32 707/737 |
| 2013/0151532 | A1* | 6/2013 | Hoyer | G06F 17/30598 707/740 |
| 2013/0173539 | A1* | 7/2013 | Gilder | G06F 17/30578 707/622 |
| 2013/0246303 | A1* | 9/2013 | Finck | G06Q 40/06 705/36 R |
| 2013/0262981 | A1* | 10/2013 | Haila | G06F 17/218 715/234 |
| 2015/0309978 | A1* | 10/2015 | Howell | G06F 17/241 715/230 |
| 2015/0378974 | A1* | 12/2015 | Massand | G06F 17/24 715/229 |

\* cited by examiner

Note 5 — Earnings Per Share

Basic earnings per share is computed based only on the weighted average number of common shares outstanding during the period. Diluted earnings per share is computed using the weighted average number of common shares outstanding during the period, plus the dilutive effect of potential future issuances of common stock relating to stock option programs and other potentially dilutive securities using the treasury stock method. In calculating diluted earnings per share, the dilutive effect of stock options is computed using the average market price for the respective period. In addition, the assumed proceeds under the treasury stock method include the average unrecognized compensation expense of stock options that are in-the-money and restricted stock units. This results in the "assumed" buyback of additional shares, thereby reducing the dilutive impact of stock options. Potential shares related to certain of the Company's outstanding stock options were excluded because they were anti-dilutive. Those potential shares, determined based on the weighted average exercise prices during the respective years, related to the Company's outstanding stock options could be dilutive in the future.

| In Millions, except Share Data | 3 Months Ended | | 9 Months Ended | |
|---|---|---|---|---|
| | Mar. 31, 2011 | Mar. 31, 2010 | Mar. 31, 2011 | Mar. 31, 2010 |
| Net income available for common shareholders (A) | 5,232 | 4,006 | 17,276 | 14,242 |
| Weighted average shares of common stock (B) | 8,420 | 8,767 | 8,511 | 8,846 |
| Dilutive effect of stock-based awards | 90 | 109 | 98 | 109 |
| Common stock and common stock equivalents (C) | 8,510 | 8,876 | 8,609 | 8,955 |
| Earnings per share: | | | | |
| Basic (A/B) | 0.62 | 0.46 | 2.03 | 1.61 |
| Diluted (A/C) | 0.61 | 0.45 | 2.01 | 1.59 |

Fig. 2

<P ID="xdx_80__EarningsPerShareTextBlock" STYLE="margin: 0pt; font: 10pt Arial, Helvetica, Sans-Serif">
<B>Note 5 &#8212; Earnings Per Share</B></P>

The xdx_80 engram identifies a Level I text block

Note 5 — Earnings Per Share

Basic earnings per share is computed based only on the weighted average number of common shares outstanding during the period. Diluted earnings per share is computed using the weighted average number of common shares outstanding during the period, plus the dilutive effect of potential future issuances of common stock relating to stock option programs and other potentially dilutive securities using the treasury stock method. In calculating diluted earnings per share, the dilutive effect of stock options is computed using the average market price for the respective period. In addition, the assumed proceeds under the treasury stock method include the average unrecognized compensation expense of stock options that are in-the-money and restricted stock units. This results in the "assumed" buyback of additional shares, thereby reducing the dilutive impact of stock options. Potential shares related to certain of the Company's outstanding stock options were excluded because they were anti-dilutive. Those potential shares, determined based on the weighted average exercise prices during the respective years, related to the Company's outstanding stock options could be dilutive in the future.

| In Millions, except Shares Data | 3 Months Ended | | 9 Months Ended | |
|---|---|---|---|---|
| | Mar. 31, 2011 | Mar. 31, 2010 | Mar. 31, 2011 | Mar. 31, 2010 |
| Net income available for common shareholders (A) | 5,232 | 4,036 | 17,276 | 14,242 |
| Weighted average shares of common stock (B) | 8,420 | 8,767 | 8,511 | 8,846 |
| Dilutive effect of stock-based awards | 90 | 109 | 98 | 102 |
| Common stock and common stock equivalents (C) | 8,510 | 8,876 | 8,609 | 8,955 |
| Earnings per share: | | | | |
| Basic (A/B) | 0.62 | 0.46 | 2.03 | 1.61 |
| Diluted (A/C) | 0.61 | 0.45 | 2.01 | 1.59 |

Fig. 6

<TABLE ID="xdx_88" SUMMARY="xdx: Disclosure - Basic and Diluted Earnings Per Share (Detail)" CELLSPACING="0" CELLPADDING="0" STYLE="width: 100%; font: 10pt Times New Roman, Times, Serif">

The xdx_88 engram identifies a Level III table text block

| In Millions, except Share Data | 3 Months Ended | | 9 Months Ended | |
|---|---|---|---|---|
| | Mar. 31, 2011 | Mar. 31, 2010 | Mar. 31, 2011 | Mar. 31, 2010 |
| Net income available for common shareholders (A) | 5,232 | 4,006 | 17,276 | 14,242 |
| Weighted average shares of common stock (B) | 8,420 | 8,767 | 8,511 | 8,846 |
| Dilutive effect of stock-based awards | 90 | 109 | 98 | 109 |
| Common stock and common stock equivalents (C) | 8,510 | 8,876 | 8,609 | 8,955 |
| Earnings per share: | | | | |
| Basic (A/B) | 0.62 | 0.46 | 2.03 | 1.61 |
| Diluted (A/C) | 0.61 | 0.45 | 2.01 | 1.59 |

Fig. 7

```
<TD ID="xdx_49_20110101_20110331"
STYLE="text-align: center; border-bottom: Black 1pt solid">Mar. 31, 2011</TD>
```

The xdx_49 engram identifies Level IV context (columns)

| In Millions, except Share Data | 3 Months Ended | | 9 Months Ended | |
|---|---|---|---|---|
| | Mar. 31, 2011 | Mar. 31, 2010 | Mar. 31, 2011 | Mar. 31, 2010 |
| Net income available for common shareholders (A) | 5,232 | 4,006 | 17,276 | 14,242 |
| Weighted average shares of common stock (B) | 8,420 | 8,767 | 8,511 | 8,846 |
| Dilutive effect of stock-based awards | 90 | 109 | 98 | 109 |
| Common stock and common stock equivalents (C) | 8,510 | 8,876 | 8,609 | 8,955 |
| Earnings per share: | | | | |
| Basic (A/B) | 0.62 | 0.46 | 2.03 | 1.61 |
| Diluted (A/C) | 0.61 | 0.45 | 2.01 | 1.59 |

Fig. 8

```
<TR ID="xdx_40C_NetIncomeLoss"
STYLE="vertical-align: bottom; background-color: #CCEEFF">
```

The xdx_40 engram
identifies Level IV labels (rows)

| | 3 Months Ended | | 9 Months Ended | |
|---|---|---|---|---|
| In Millions, except Share Data | Mar. 31, 2011 | Mar. 31, 2010 | Mar. 31, 2011 | Mar. 31, 2010 |
| Net income available for common shareholders (A) | 5,232 | 4,006 | 17,276 | 14,242 |
| Weighted average shares of common stock (B) | 8,420 | 8,767 | 8,511 | 8,846 |
| Dilutive effect of stock-based awards | 90 | 109 | 98 | 109 |
| Common stock and common stock equivalents (C) | 8,510 | 8,876 | 8,609 | 8,955 |
| Earnings per share: | | | | |
| Basic (A/B) | 0.62 | 0.46 | 2.03 | 1.61 |
| Diluted (A/C) | 0.61 | 0.45 | 2.01 | 1.59 |

Fig. 9

Level I Text Block    ID="xdx_80__EarningsPerShareTextBlock"
    Level III Block    ID="xdx_88" SUMMARY="xdx: Disclosure - Basic and Diluted Earnings Per Share (Detail)" 310
    Level IV Context    ID="xdx_49_20110101_20110331"
    Level IV Label    ID="xdx_40C_NetIncomeLoss"

311 — At Level IV, the combined engrams identify each fact

{ ...text... 1.76 ...text... }
         245  740

245

|  | 3 Months Ended | | 9 Months Ended | |
|---|---|---|---|---|
| In Millions, except Share Data | Mar. 31, 2011 | Mar. 31, 2010 | Mar. 31, 2011 | Mar. 31, 2010 |
| Net income available for common shareholders (A) | 8,232 | 4,006 | 17,270 | 14,242 |
| Weighted average shares of common stock (B) | 8,420 | 8,767 | 8,511 | 8,846 |
| Dilutive effect of stock-based awards | 90 | 109 | 98 | 109 |
| Common stock and common stock equivalents (C) | 8,510 | 8,876 | 8,609 | 8,955 |
| Earnings per share: | | | | |
| Basic (A/B) | 0.62 | 0.46 | 2.03 | 1.61 |
| Diluted (A/C) | 0.61 | 0.45 | 2.01 | 1.59 |

METHOD AND APPARATUS FOR SYNCHRONIZING FINANCIAL REPORTING DATA

CROSS REFERENCE TO RELATED APPLICATION

This application claims the benefit of priority to U.S. Provisional Application No. 61/661,061, filed on Jun. 18, 2012, which is incorporated by reference herein in its entirety.

FIELD OF THE INVENTION

This invention relates to synchronizing and linking of data elements in hypertext financial reports that are generated by companies to meet regulatory requirements for reporting financial performance, and more specifically to the accurate updating of the data elements throughout the financial reports.

BACKGROUND OF THE INVENTION

Financial reporting as mandated in government regulations is complex. The rules require various links among the data elements, provide overlapping definitions of both the data elements and their links, define required report outputs, report formats and arbitrary methods to rename and reorganize the financial information that flows from the source companies to the viewers of the reports.

The data for financial reports conventionally originate in spreadsheets or word processing text forms prepared by company agents in applications such as Microsoft's Excel spreadsheet software or Microsoft's Word word processor software. These data must be reconfigured into reporting formats that meet government and regulatory reporting requirements issued by the U.S. Securities and Exchange Commission ("SEC") along with certain accounting standards set by non-governmental organizations ("NGOs") such as the Financial Accounting Standards Board ("FASB").

To reconcile and harmonize financial data, a markup system known as eXtensible Business Reporting Language ("XBRL"), built on the general eXtensible Markup Language platform ("XML"), has been adopted by many entities responsible for providing and presenting financial reports. A specification for XBRL is developed and published by XBRL International, Inc., which states:

"XBRL is a powerful and flexible version of XML which has been defined specifically to meet the requirements of business and financial information. It enables unique identifying tags to be applied to items of financial data, such as 'net profit'. However, these tags are more than simple identifiers. They provide a range of information about the item, such as whether it is a monetary item, percentage or fraction. XBRL allows labels in any language to be applied to items, as well as accounting references or other subsidiary information.

"XBRL can show how items are related to one another. It can thus represent how they are calculated. It can also identify whether they fall into particular groupings for organizational or presentational purposes. Most importantly, XBRL is easily extensible, so companies and other organizations can adapt it to meet a variety of special requirements.

"The rich and powerful structure of XBRL allows very efficient handling of business data by computer software. It supports all the standard tasks involved in compiling, storing and using business data. Such information can be converted into XBRL by suitable mapping processes or generated in XBRL by software. It can then be searched, selected, exchanged or analyzed by computer, or published for ordinary viewing."

XBRL provides a system of tagging the data elements it provides in a financial report. This means that in an XBRL report with tags embedded in it, a PC, laptop, tablet, or other computing device can identify and appropriately process the data by referencing one or more tags corresponding to the data.

In general, XBRL defines a set of XML based data structures, conventions and terminology to represent financial and other data. Each important data object within a financial report is presented as a "fact". For example, the number representing the "current notes payable" by a reporting entity would be considered a "monetary fact" while a description of the account principals employed would be a "text fact". To identify a fact in a meaningful and computer readable form, the fact is contained within an XML "element". That element may then be identified from a large set of similarly predefined elements. For example, in the US, a set of accepted elements has been created representing financial principles as defined by the Generally Accepted Accounting Principles or US-GAAP. Custom elements, if desired, may be defined by the author/preparer due to the flexibility built into XBRL. In order for the fact to have meaning for a specific time, the fact is also identified by a "context". Contexts can be as simple as a single date or as complex as a date range qualified by a dimension to add depth to facts. A provision within XBRL allows authors to describe one or more "presentations". Presentations provide information for any third party rendering software to be able to group elements and "labels" for the eventual visual display of facts in a manner meaningful to a human reader. Labels have a specific relationship or role when associated with a specific element. For example, within one presentation the element "Profit" may have the label "Income (loss)", whereas on another presentation that tallies net loss carry forwards, the label may have a negated value to show the same data as "Losses". In such a scenario, the fact may be shown as a negative number on an operating statement and a positive number within a disclosure.

Traditionally, the SEC has required entities to prepare their documents for submission in either plain text ("ASCII filing") or as HyperText Markup Language ("HTML"). HTML, when combined with certain styling properties ("CSS"), can uniformly represent the majority of formatting for documents to be displayed within common interne browsers such as Internet Explorer, or Mozilla Firefox. With the implementation of XBRL, certain aspects of various forms filed with the SEC must be detailed and tagged as a separate exhibit in XBRL format. The HTML portion of a submission is considered by regulation as the "official" document while the XBRL portion, representing only a specific fraction of the document, is considered "as filed".

Essentially, XBRL does not affect any additional disclosure by the submitter but does require data to be more clearly identified and computer readable. As such, certain information may be duplicated between the HTML and the XBRL. Further, the SEC now requires that financial statements and certain related notes be tagged using four different levels of detail:

Level I—Each disclosure is tagged as a single block of text;

Level II—Each significant accounting policy is tagged as a single block of text, with tables and other narrative facts broken out as in Levels III and IV;

Level III—Each table is tagged as a separate block of text; and

Level IV—Each fact (i.e., monetary value, percentage, and number) is separately tagged.

Certain factual information set forth in Level I will be duplicated and further refined in Levels II-IV. For example, a table describing various assets of a company will be formatted as block text and mixed with narrative in Level I; broken away from the narrative and set forth as table(s) facts in Level III; and finally have each number detailed as tagged XBRL elements in Level IV. In a typical submission to the SEC, one number may be duplicated in four data areas as well as interdependent on an account basis in one or more areas. For example, a table detailing assets may be: (i) in the official HTML document; (ii) a part of a Level I complete text block describing the assets as a note to the financials; (iii) a part of a table text block in Level III; and, finally (iv) a detailed tagged fact within a presentation identified by an XBRL element and a context (date). The same fact may be used in multiple places within a document. For example, a detailed table of financial "cash" instruments may total to a number that will appear in one or more tables within the note and also appear as line item on a statement such as a balance sheet.

Prior to filing, many reports are "converted" to a commonly acceptable format such as HTML, which may later be distilled into XBRL. Since HTML describes document structure, not data relationships, it is more limited in certain respects than is XBRL or XML, but it is the form in which spreadsheets and word processors commonly produce their outputs. The result is that many translations and mappings may be performed manually to produce a compliant financial report. Thus, simplification, streamlining, and reconciling of all the variations in a report is desirable.

Finally, as a convention that may be used herein, the terms HTML and XHTML are interchangeable. The SEC may accept a limited set of legacy HTML elements for submission of official documents while HTML contained with XBRL must be formatted as XHTML. XHTML is characterized by the use of lower case elements and strict adherence to tag nesting and structure. When used within an XBRL text block, XHTML must be well formed for the document to be accepted. On the other hand, plain HTML requires proper coding and nesting but readers (commonly known as internet browsers) tend to compensate or adjust for errors to allow viewing of a wide variety of poorly coded documents. A poorly formed HTML document will be accepted as an official document filed to the SEC while the same document content contained in XBRL must be well formed.

XBRL, XML and HTML all are based on SGML ("Standard Generalized Markup Language") where coding information is differentiated from data via the use of chevron characters, '<' and '>', which in turn contain elements, such as a 'P' to signify a paragraph element, and attributes, such as 'ID' to signify an identifier assignment. Any combination of the "Element-Attribute", or "Element-Attribute-Attribute . . . " if an element has more than one attribute available to it, is referred to as a "tag". Within a tag, characterizing information for the text being marked up is stored between the '<' and '>' characters. An example:

<P ID="identifier-1">text being marked up</P> where "P" is the Paragraph element of HTML, "ID" is the Identifier attribute of the paragraph being presented, "identifier-1" is the value of the Identifier, "text being marked up" is the text of the paragraph, and "</P>" marks the end of the paragraph.

The conventional term "tagging" data implies adding specific tags to identify various sections of data. For HTML, the identified data is typically headings, paragraphs, tables, and cells of data within tables. For XBRL, the identified data is substantially more complex and involves facts, labels, contexts and a variety of other information. HTML is principally designed to represent document structure for human consumption while XBRL is principally designed to represent financial data in the form of both an addressable database and for human presentation.

SUMMARY OF THE INVENTION

Embodiments disclosed herein exploit coding space in the tags used by HTML to store, search for, and retrieve data-tagging information related to XBRL in its various forms (e.g., inline and standalone), thereby streamlining and simplifying regulated financial report updating, preparation, and editing. For this purpose, a data exchange system and method is used, referred to herein as XBRL Data Exchange ("XDX"), which is a computer program that adds and maintains intelligence to enable processing of the data-tagging information from XBRL to HTML and back without loss of information with respect to the report data elements involved. Since there is no information loss in the method described herein, the preserved data and data relationships can be moved back and forth flexibly among different document formats. This preservation allows a report presented in HTML to be marked up in that form and returned for further processing and presentation in XBRL with its data tags intact. Likewise, a report in XBRL form can be edited and restructured back into HTML for processing and presentation in that form, again with data tags intact. XDX stores certain information, as will be described below, within the ID attribute as well as other attributes to perform the HTML-XBRL data exchange, which information is referred to herein as an XDX Engram.

In one embodiment, a means of exploiting unused coding space in the tags used by HTML to store and retrieve data-tagging information needed in XBRL is disclosed. For this purpose a data exchange program and system is utilized that enables processing of the data-tagging information from XBRL to HTML and back without loss of information concerning the reporting data elements involved. Since there is no information loss in the method, the preserved data and data relationships can be moved back and forth flexibly among different formats. This preservation allows a report presented in HTML to be marked up in that form and returned for further processing and presentation in XBRL with its data tags intact. Likewise, a report in XBRL form can be edited and restructured back into HTML for processing and presentation in that form, again with data tags intact.

In another embodiment, a method and apparatus accurately synchronizes one or more items of financial information between a plurality of representations, or presentations, of marked up financial data stored in electronic form. The different representations may include balance sheets, income statements, and cash flow statements, among various other financial data, that may share common financial facts that are presented in a selected reporting format corresponding to the representations. Identifiers are assigned to the data so that instances of the facts may be automatically and simultaneously updated throughout the different representations each time a fact is updated in one representation.

In another embodiment, a computer implemented method comprises receiving an indication, or an electronic signal, or a combination thereof, of a change made to a data field of an electronic document. An engram list associated with the document is accessed including identifying an attribute associated with the data field. Other data fields are searched to identify those other data fields in the document, or related documents, having the same attribute associated therewith. The other data fields found in the document, or in the related documents, are updated if they have the attribute associated therewith.

In another embodiment, a method is disclosed for accurately synchronizing one or more items of textual information between first and second representations of marked up financial data in electronic form. The method comprises selecting a first attribute from a plurality of attributes used in the first representation of the marked up financial data. Assigning an identifier to each item of textual information in the first representation and assigning the identifier to the first attribute in the first representation is then performed, followed by storing the identifier of the first attribute and the item of textual information to which the identifier is assigned. A second attribute is selected from a plurality of attributes used in the second representation of the marked up financial data. The first attribute of the first representation of the marked up financial data is associated with the second attribute of the second representation of the marked up financial data, and the identifier of the first attribute is associated to the identifier of the second attribute. The item of textual information having the identifier of the first attribute in the first representation of the marked up financial data is compared to the item of textual information having the associated identifier of the second attribute in the second representation of the marked up financial data. A version of the item of textual information having the identifier of the first attribute is copied to an item of textual information having the associated identifier of the second attribute in the second representation of the marked up financial data using the associated values assigned to the identifiers.

In another embodiment, a computer system comprises a processor, a memory operatively connected to the processor which stores data that may be accessed by the processor for storage and retrieval. A user interface controlled by the processor may be used for allowing interaction with the processor by a user. A plurality of representations of a financial report may be stored in the memory in electronic form for access by the processor. A computer program configured for execution by the processor operates to synchronize data in a first representation of the financial report with one or more of the other representations of the financial report.

These, and other, aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. For example, the summary descriptions above are not meant to describe individual separate embodiments whose elements are not interchangeable. In fact, many of the elements described as related to a particular embodiment can be used together with, and possibly interchanged with, elements of other described embodiments. Many changes and modifications may be made within the scope of the present invention without departing from the spirit thereof, and the invention includes all such modifications. It is to be understood that the attached drawings are for purposes of illustrating the concepts of the invention. The figures below are intended to be drawn neither to any precise scale with respect to relative size, angular relationship, or relative position nor to any combinational relationship with respect to interchangeability, substitution, or representation of an actual implementation.

BRIEF DESCRIPTION OF THE DRAWINGS

FIG. 2 shows an exemplary appearance and components of a page of a financial document;

FIG. 6 shows one embodiment of an ID tag structure at XBRL Level I;

FIG. 7 shows one embodiment of a table text ID tag structure at XBRL Level III;

FIG. 8 shows one embodiment of a context ID tag structure at XBRL Level IV;

FIG. 9 shows one embodiment of a label ID tag structure at XBRL Level IV;

FIG. 10 shows one embodiment of a combined ID tag structure at XBRL Level IV as it identifies facts in a report;

DETAILED DESCRIPTION OF THE INVENTION

Disclosed herein is a system and method to ensure accurate and reliable mappings between a textual, free-form HTML report originally created in one or more applications such as Microsoft's Word word processing software or Excel spreadsheet software and a formal structured XBRL report presented in a strictly regulated form to satisfy governmental filing obligations. Embodiments disclosed herein define an identifier for each fact, label, or other object that appears in a free-form report, map the defined tag to known names, other tags, and other identifiers used for the same object in formal settings, and insert the tag into the location in a textual report where the tagged datum will appear. To store tags in an HTML document, embodiments disclosed herein use the existing "ID" HTML attribute and namespace shared among numerous HTML elements, such as the table row ("TR") and table data ("TD") attribute elements commonly used in financial reports to structure table rows and data cells, respectively. Note that as used herein, HTML and XHTML are interchangeable and the use of elements as uppercase is synonymous with lower case HTML elements and attributes.

Figure 1A:
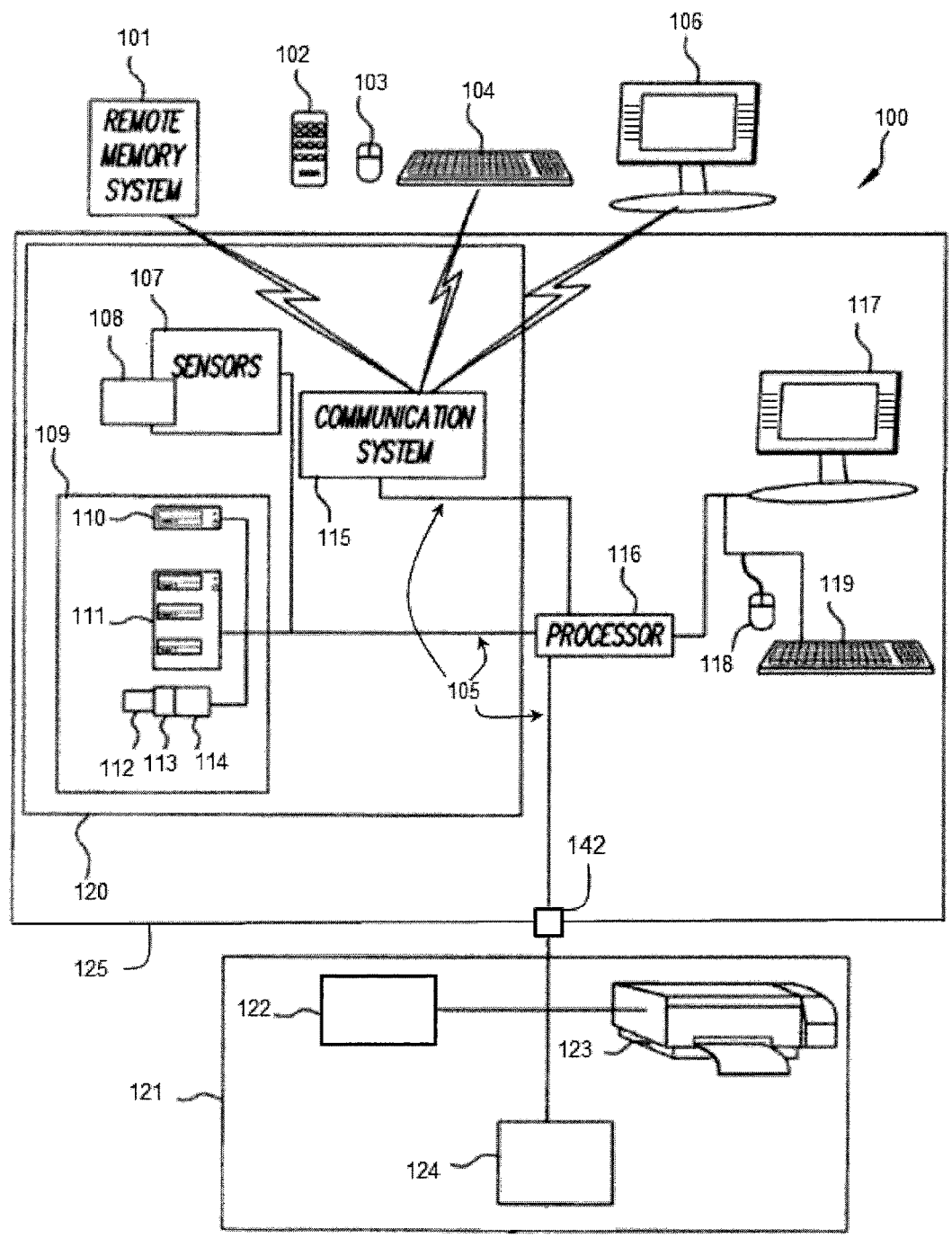
FIG. 1A illustrates a schematic diagram of an exemplary computer system apparatus suitable for performing the methods disclosed herein.

FIG. 1 illustrates in a generic schematic format a computing system for implementing preferred embodiments of the present invention. Electronic apparatus and processing system 100 may be used for generating financial reports compliant with governmental regulations as described herein. In one embodiment as illustrated in FIG. 1, electronic computing system 100 comprises a housing 125 and local memory, system memory, or storage 109 containing data files, optional remote user input devices 102-104, local user input devices 118-119, an optional remote output system 106, and a local output system 117, wherein all electronics are either hardwired to processor system 116 or optionally connected wirelessly thereto via Wi-Fi or cellular through communication system 115. Output systems 106 and 117 depict display screens and audio speakers. While these displays and speakers are illustrated as standalone apparatuses, each can also be integrated into a hand held computing system such as a smart phone or a tablet computer system. The computer system 100 may include specialized graphics subsystem to drive output display 106, 117. The output display may include a CRT display, LCD, LED, or other forms. The connection between communication system 115 and the remote I/O devices is also intended to represent local network and internet (network) connections to processing system 116. Optional remote memory system 101 can represent network accessible storage, and storage such as used to implement cloud computing technology. Remote and local storage (or memory) illustrated in FIG. 1 can be used as necessary for storing computer programs and data sufficient for processing system 116 to execute the algorithms disclosed herein. Data memory and storage systems 109, user input systems 102-104 and 118-119 or output systems 106 and 117, and processor system 116 can be located within housing 125 or, in other preferred embodiments, can be individually located in whole or in part outside of housing 125. It should be understood in advance that the components and functions shown in FIG. 1A are intended to be illustrative only and embodiments of the invention are not limited thereto. Although the present disclosure includes a detailed description of computer system 100, implementation of the teachings recited herein are not limited to such. Rather, embodiments of the present invention are capable of being implemented in conjunction with any other type of computing environment now known or later developed, including a distributed computing environment and a cloud computing environment as described below.

Data systems 109 can include any form of electronic or other circuit or system that can supply digital data to processor system 116 from which the processor can derive financial information and related data for use in generating required financial reports. In this regard, the data files delivered from systems 109 can comprise, for example and without limitation, financial data, text, programs, images, or other forms of financial information digital image and audio programs such as slideshows. In the preferred embodiment of FIG. 1, sources of data files also include those provided from a variety of sources such as digital media or from a network data connection, data received from communication system 115, and various detachable or internal memory and storage devices coupled to processing system 116 via systems 109.

Sensors 107 are optional and can include light sensors, audio sensors, such as microphones, image capture devices, biometric sensors and other sensors known in the art that can be used to detect and record conditions in the environment of system 100 and to convert this information into a digital form for use by processor system 116. Sensors 107 can also include one or more sensors 108 that are adapted to capture digital still or video images.

Storage/Memory systems 109 can include conventional memory devices such as solid state, magnetic, HDD, optical or other data storage devices, and circuitry for reading removable or fixed storage media. Storage/Memory systems 109 can be fixed within system 100 or can be removable, such as HDDs, memory cards/sticks, and floppy disk drives. In the embodiment of FIG. 1, system 100 is illustrated as having a hard disk drive (HDD) 110, disk drives 111 for removable disks such as an optical, magnetic or specialized disk drives, and a slot 114 for portable removable memory devices 112 such as a removable memory card, USB thumb drive, or other portable memory devices, including those which may be included internal to a smart phone, tablet computer or other handheld device, which may or may not have a removable memory interface 113 for communicating through memory slot 114. Although not illustrated as such, memory interface 113 also represents a wire for connecting memory devices 112 to slot 114. Data including, but not limited to, control programs, financial information, digital images, application programs, metadata, and computer generated images can also be stored in a remote memory system 101, as well as locally, such as in a personal computer, network server, computer network or other digital system such as a cloud computing system. Remote system 101 is shown coupled to processor system 116 wirelessly, however, such systems can also be coupled over a wired network connection or a mixture of both.

In the embodiment shown in FIG. 1, system 100 includes a communication system 115 that in this embodiment can be used to communicate with an optional remote memory system 101, an optional a remote display 106, and/or optional remote inputs 102-104. A remote input station including remote display 106 and/or remote input controls 102-104 communicates with communication system 115 wirelessly, as illustrated, or can communicate as a wired network. Local input station including either or both a local display system 117 and local inputs can be connected to processor system 116 using a wired (illustrated) or wireless connection such as Wi-Fi or infra-red transmission.

Communication system 115 can comprise for example, one or more optical, radio frequency or other transducer circuits or other systems that convert image and other formatted data into a form that can be conveyed to a remote device such as remote memory system 101 or remote display device 106 configured with digital receiving apparatus, using an optical signal, radio frequency signal or other form of signal. Communication system 115 can also be used to receive a digital image and other financial digital data from a host or server computer or network (not shown) or a remote memory system 101. Communication system 115 provides processor system 116 with information and instructions from corresponding signals received thereby. Typically, communication system 115 will be adapted to communicate with the remote memory system 101, or output system 106 by way of a communication network such as a conventional telecommunication or data transfer network such as the internet, a cellular, peer-to-peer or other form of mobile telecommunication network, a local communication network such as wired or wireless local area network or any other conventional wired or wireless data transfer system.

User input systems are operatively connected to processor 116 and provide a way for a user of system 100 to provide instructions, or selections via a customized user interface, to the processor 116. This allows such a user to make a designation of data files, and other selections, to be used in generating financial reports as described herein. User input system 102-104 and 118-119 can also be used for a variety of other purposes including, but not limited to, allowing a user to arrange, organize, format, and edit content data files to be incorporated into the financial reports, to provide information about the user or audience, to provide annotation data such as voice and/or text data, to identify and tag characters, text, or other financial data or blocks of financial data in the content data files, to enter metadata not otherwise extractable by the computing system, and to perform such other interactions with system 100 as will be described herein.

In this regard user input systems 102-104 and 118-119 can comprise any form of transducer or other device capable of receiving an input from a user and converting this input into a form interpreted by processor system 116. For example, user input system can comprise a touch screen input at 106 and 117, a touch pad input, a 4-way switch, a 6-way switch, an 8-way switch, a stylus system, a trackball system or mouse such as at 103 and 118, a joystick system, a voice recognition system such as at 108, a gesture recognition system such as at 107, a keyboard, a remote control 102, cursor direction keys, on screen keyboards, or other such systems. In the embodiment shown in FIG. 1, remote input system can take a variety of forms, including, but not limited to, a remote keyboard 104, a remote mouse 103, and a remote control 102. Local input system includes local keyboard 119, a local mouse 118, microphone 108, and other sensors 107, as described above.

Additional input or output systems 121 are used for rendering images, text or other formatted graphical representations in a manner that allows financial reports to be arranged according to desired and authorized formats. In this regard, output systems 121 can comprise any conventional structure or system that is known for providing, printing or recording data and images, including, but not limited to, printer 123 and, for example, scanner 122. Printer 123 can record images on a tangible surface using a variety of known technologies including, but not limited to, conventional four color offset separation printing, laser printing and other electrophotographic means. For the purpose of the following discussions, printer 123 will be described as being of a type that prints images, tables, other forms and/or text upon compatible media.

In certain embodiments, the source of data files 109, user input systems 102-104 and output systems 106, 117, and 121 can share components. Processor system 116 operates system 100 based upon signals from user input system 102-104 and 118-119, sensors 107-108, storage/memory 109 and communication system 115. Processor system 116 can include, but is not limited to, a programmable digital computer, a programmable microprocessor, a programmable logic processor, multi-processing systems, a chipset, a series of electronic circuits, a series of electronic circuits reduced to the form of an integrated circuit, or a series of discrete components on a printed circuit board.

Processing system 100 can be configured as a workstation, laptop, kiosk, PC, and hand held devices such as smart phones and tablet computers. As an exemplary workstation, the computer system central processing unit 116 communicates over an interconnect bus 105. The CPU 116 may contain a single microprocessor, or may contain a plurality of microprocessors for configuring the computer system 100 as a multi-processor system, and high speed cache memory comprising several levels. The memory system 109 may include a main memory, a read only memory, mass storage devices such as tape drives, or any combination thereof. The main memory typically includes system dynamic random access memory (DRAM). In operation, the main memory stores at least portions of instructions for executions by the CPU 116. For a workstation, for example, at least one mass storage system 110 in the form of an HDD or tape drive, stores the operating system and application software. Mass storage 110 within computer system 100 may also include one or more drives 111 for various portable media, such as a floppy disk, flash drive, a compact disc read only memory (CD-ROM or DVD-ROM), or an integrated circuit non-volatile memory adapter 114 (i.e. PC-MCIA adapter) to provide and receive instructions and data to and from computer system 100.

Computer system 100 also includes one or more input/output interfaces 142 for communications, shown by way of example as an interface for data communications to printer 123 or another peripheral device 122-124. The interface may be a USB port, a modem, an Ethernet card or any other appropriate data communications device. The physical communication links may be optical, wired, or wireless. If used for scanning, the communications enable the computer system 100 to receive scans from a scanner 122, or documentation therefrom, to a printer 123 or another appropriate output or storage device.

Figure 1B:
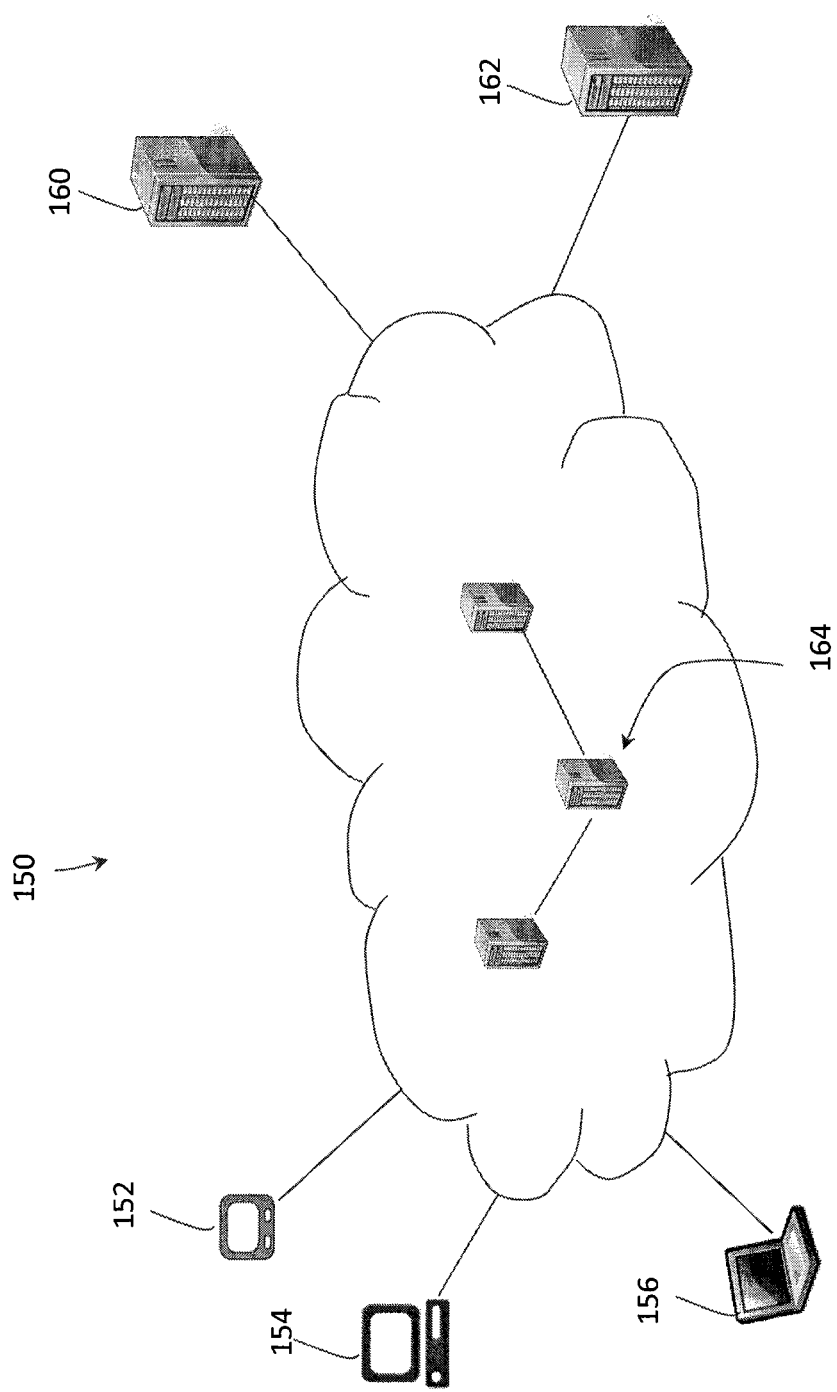
FIG. 1B illustrates a cloud computing environment according to an embodiment of the present invention.

With reference to FIG. 1B, computer system 100 may be embodied, for example, as a tablet computer 152, workstation 154, or laptop 156, or other suitable computing system capable of being configured to store and execute the computer programs described herein. The computing systems 152, 154, 156, may be connected to a network 150 for communicating the financial data disclosed herein over the network 150, such as the internet, virtual private network (VPN), or other large or small scale networks, to a representative computing systems 160 which may comprise, in various forms, a web server, workstation, a mainframe, or another suitable computing system such as may be configured at U.S. government run installations, or elsewhere, wherein websites, such as SEC receiving sites, may receive electronically submitted financial forms as described herein that are generated by computing system 100.

FIG. 1B is further illustrative of a cloud computing environment 150 as depicted. The cloud computing environment 150 may comprise one or more cloud computing nodes 162, 164 with which local computing devices used by cloud consumers, such as, for example, tablet computer 152, workstation 154, or laptop 156, may communicate. Nodes 162, 164 may communicate with one another. They may cooperate physically or virtually, in one or more separate networks. This allows cloud computing environment 150 to offer platforms and software applications, such as described in embodiments herein, as services for which a cloud consumer does not need to maintain resources on a local computing device. It is understood that the computing devices 152, 154, 156, are intended to be illustrative only and that computing nodes 162, 164 and cloud computing environment 150 can communicate with any type of computerized device over any type of network and/or network addressable connection (e.g., using a web browser).

The cloud environment 150 allows a convenient, on-demand network access by consumers, 152, 154, 156, to a pool of computing resources, e.g., applications, storage, and services on network nodes 162, 164 that can be rapidly provisioned and released with minimal management effort or service provider interaction. The cloud environment may provide resources for consumers to use the XDX application program described herein. A consumer may, for example, unilaterally provision computing resources, such as server time and, as needed, to generate financial reports as describe herein by accessing platforms and applications provided by cloud computing nodes 162, 164 automatically without requiring human interaction with each service's provider. Required XDX platforms and applications are available over the network and accessed through standard mechanisms that promote use by thin, e.g., web browser, or thick client platforms, e.g., laptops 156, tablets 152, and workstations 154. To the consumer, accessing and using capabilities available for financial report provisioning may be purchased in any quantity at any time. The cloud environment 150 may automatically control resource use by leveraging a metering capability at some level appropriate to the type of service, e.g., storage, processing, bandwidth, and maintenance of user accounts. Resource usage may be monitored and controlled by appropriate usage policies at the cloud computing nodes.

Cloud computing nodes 162, 164 are exemplary and are not intended to suggest any limitation as to the scope of use or functionality of embodiments described herein. Cloud computing nodes 162, 164 are capable of being implemented and/or performing any of the functionality set forth hereinabove with reference to FIG. 1A. The cloud computing nodes 162, 164 may comprise a computer system/server which may be operational with numerous other general purpose or special purpose computing system environments as described herein, including personal computer systems 154, server computer systems 160, and laptop devices 156. Cloud computing nodes 162, 164 may be implemented in distributed cloud computing environments where tasks are performed by remote processing devices 164 that are linked through a communications network 150. In a distributed cloud computing environment, program modules may be located in both local and remote computer system storage media including memory storage devices. Cloud computing node 162, 164 may comprise a general-purpose computing device as described above with reference to FIG. 1A. The components may include, but are not limited to, one or more processors or processing units 116, a system memory 109, and a bus 105 that couples various system components including system memory 109 to processor 116. Program modules may be stored in memory and generally carry out the functions and methodologies of embodiments of the invention as described herein. Cloud computing node 162, 164, may also communicate with one or more external devices such as a keyboard 104, 119, a pointing device 103, 118, a display 106, 117, etc.; one or more devices that enable a user to interact with computer system/server 162, 164 and any devices, e.g., network card, modem, etc., that enable computer system/server 162, 164, to communicate with one or more other computing devices.

As used herein, terms such as computer or machine readable medium refer to any non-transitory medium that stores or participates, or both, in providing instructions to a processor for execution. Such a medium may take many forms, including but not limited to, non-volatile media and volatile media. Non-volatile media include, for example, optical or magnetic disks, flash drives, and such as any of the storage devices in any computer(s) operating as one of the server platforms, discussed above. Volatile media include dynamic memory, such as main memory of such a computer platform. Transitory physical transmission media include coaxial cables; copper wire and fiber optics, including the wires that comprise a bus within a computer system, a carrier wave transporting data or instructions, and cables or links transporting such a carrier wave. Carrier-wave transmission media can take the form of electric or electromagnetic signals, or acoustic or light waves such as those generated during radio frequency (RF) and infrared (IR) data communications. Common forms of non-transitory computer-readable media therefore include, for example: a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, or any other medium from which a computer can read programming code and/or data. Many of these forms of computer readable media may be involved in carrying one or more sequences of one or more instructions to a processor for execution.

Information of a financial report typically fit into a conventional structure. With reference to FIG. 2 (a typical disclosure or note 310), the columns of numerical data 210 include monetary values while the text includes narrative 311 and table components 740. The note 310 in FIG. 2 consists of many facts, some text and some numeric. Each fact is placed in context by the use of date and other information either implied or specified. For example, the implied date for the note 310 is the date of the overall report containing the note while a specified context may be in the form of a narrative date, column heading or row grouping. The contextual data 241 along with textual data 242 visually identify the facts 245 of the report. The text displayed to the left of each fact 245 is a "label" 242 that serves as a brief descriptive title for the corresponding fact 245. When facts appear in multiple columns, each column head context label 241 defines a different context for the fact beneath it, such as a point in time, such as an instant, for example, the present point in time, or a time period, such as a duration. In this way a given fact 245 is defined by its line item or row label 242 and context label 241. From a human reader's perspective, the visual organization of the facts in the table is identified by the row label and the column header/label. An electronic search through the document containing the disclosure shown in FIG. 2 for the label "Net Income for common shareholders (A)" and context label "Mar. 31, 2010" can retrieve the fact "14,232". However, such a conventional computer search of the text could result in ambiguities or errors. For XBRL, the row is also identified by a specific element from a taxonomy along with a well-defined context eliminating potential errors. Facts, elements and their labels, and context labels can be further grouped into textual facts 310, 740 under which additional labels 211, 231 may or may not be indented to indicate data hierarchy.

Figure 3:
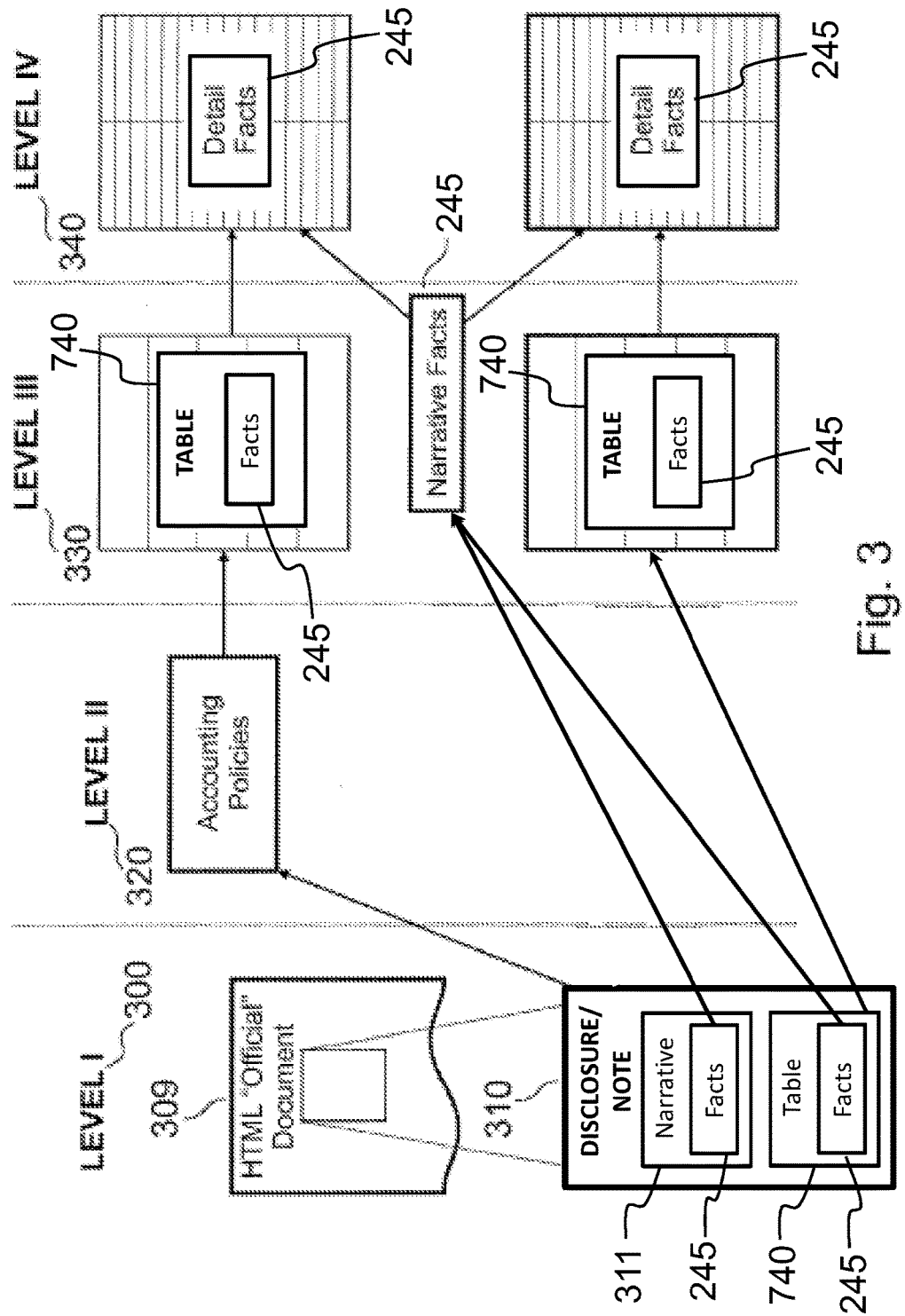
FIG. 3 shows HTML and XBRL versions of a financial report with progressive levels of detail processed by embodiments described herein.

With reference to FIG. 3, there is illustrated four levels of document tagging detail, namely, Level I 300, Level II 320, Level III 330, and Level IV 340. A financial report at Level I 300 conventionally begins as a word processing document or spreadsheet converted into HTML 309 for editing and use in Web-browser applications. The HTML official document 309 may include several sections, only a portion 310 of which may be subject to coding within XBRL. XBRL report definitions meet the requirements of the Electronic Data Gathering, Analysis and Retrieval ("EDGAR") system of the SEC. Those sections of a financial report to be coded for XBRL are generally broken into statements and disclosures. One example of a disclosure is the SEC's Form 10-K annual report required of all publicly-owned companies. FIG. 3 illustrates a breakdown and flow of one portion of a disclosure. In this form 309, termed Level I 300 in the EDGAR XBRL report definitions, the facts of the report may be visibly titled and placed, but there exists no detailed or formal definition of the labels, contexts, and elements for the data contained within the Level I Text Block 310. The Level I report 309 is, initially, essentially a single block of free-form text. Locating, updating, and capturing a fact, such as a monetary value, and its meaning, which is implied by its label and context, may require manual searching such as electronic type searches for manually specified text or numbers, through the Level I report. Such human conducted searches may be error-prone and time-consuming.

As a conventional report is advanced by a tagging procedure through the levels shown in FIG. 3, it is augmented with formal structure and formal association of its elements with one another according to the levels shown, 300, 320, 330, 340, by breaking larger textual facts into smaller granules as part of the XBRL structure. When the report reaches the Level III form 330, its tabular content is now formally separated into blocks in its XBRL version. This means that locating and capturing a fact and its meaning requires searches limited to the contents of a single table. With reference to FIG. 2, a search can be done within the limits of a table 740 without including the remainder of the contents of block 310. Readers, whether they are human readers or automated processes, may search for and identify a table within a block in order to find a specific item of data. These table based searches require less time, and generate fewer errors than those at Level I. When the report advances to the Level IV form 340, each fact to be presented is now identified as a line item by its element and context, in a form suitable for direct spreadsheet or other calculation or modeling. Retrieval of a fact 245 being presented is thereby simplified. Locating and capturing a fact at Level IV requires only the use of the fact's XBRL element name by a person or programmed process to retrieve that fact. In addition to detailing tabular facts for Level IV, embodiments disclosed herein isolate and identify certain material narrative facts 335 with an XBRL element.

Figure 4:
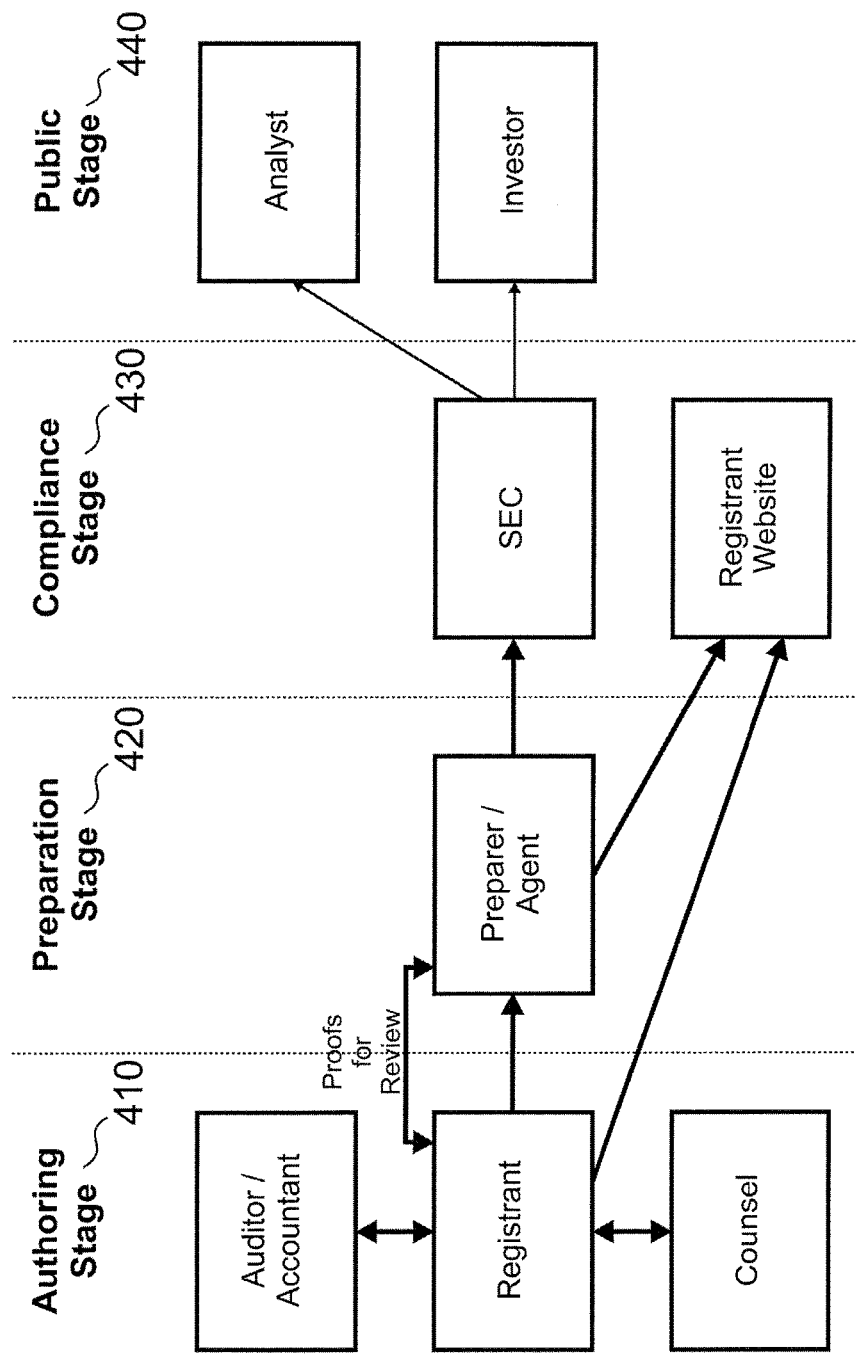
FIG. 4 shows exemplary stages of processing of financial reports and the roles of different entities involved in each stage.

As shown in FIG. 4, there is illustrated an overall process flow of the authoring, preparation, submission and consumption of a financial report. A text based financial report progresses from its human originators in the authoring Stage 410 and the Preparation Stage 420 to its users in the Compliance Stage 430 and the Public Stage 440, with the addition of coded HTML markup in the form of ID tags inserted in each page by authors and preparers according to embodiments disclosed herein.

The process shown in FIG. 3 and the staging shown in FIG. 4 may be simplified by using the following data and processing components:
1) XBRL, the markup language of the financial reports that stores officially-assigned identifiers;
2) XDX, a data-exchange procedure and program for relating and moving information between conventional HTML-format documents and XBRL-format documents;
3) XDX engrams, a data-tagging system and method for identifying and mapping information that must be presented both in conventional HTML-format documents and XBRL-format documents;

As an example, the author of a financial report, at stage 410, to be filed with EDGAR may submit to the preparer an HTML report, but the report at that stage may contain only large free-form-text block-level definitions of its content. The preparer converts the HTML report to XBRL. The process of conversion in the conventional sense may be lengthy, tedious, and error-prone, but embodiments of the XDX processing significantly reduce the effort required for the first step of mapping data values from Word or HTML to XBRL. During the Preparation Stage 420, in the embodiments described herein, XBRL conversion and mapping is performed, and data-identifying XDX engrams are inserted as described hereinbelow.

The term "engram" as used herein refers to a block of data used for precise tracking and matching of corresponding facts in different copies, versions, formats, and drafts of the same report. Engrams allow information to be embedded within a human-readable HTML document to identify or connect parcels of information to the XBRL instance of the data. Since HTML can be used to represent facts with an XBRL dataset, engrams can be used to cross-identify any facts that are both embedded within an HTML document's text and also represented as discrete facts within the XBRL instance. XBRL, implemented as a special subset of XML, may be used to identify each fact and its place in a financial report. The use of the HTML ID tag in a report preserves the identification of facts, contexts, labels, and tables established in XBRL as copies of the report move back and forth between XBRL and HTML.

After the preparation and mapping from Word or HTML to XBRL has been performed, the map is preserved in both the HTML and XBRL forms of the report through the use of the HTML ID tag. Each prepared ID tag comprises an assigned engram identifying corresponding data for both HTML and XBRL handling. After the markup formats and content are reconciled via the addition of the engrams stored in the HTML ID, the contents of a given report can be mapped back and forth freely and accurately between text forms, spreadsheet forms, and XML forms. This simplification avoids a great deal of specialized manual scrutiny and correction of reports, and enables the easy deployment and use of new representations of the reports, as described hereinbelow. XDX information can be used to both synchronize and link content as well as preserve XBRL information for use in subsequent periodic reports. Upon completion of a report, a registrant or preparer will submit the HTML official document, ancillary documents, and the XBRL to the SEC. Within the Compliance Stage 430 processing and the Public Stage 440, XDX information is inert and can optionally be used by third parties, or, for example, XDX information can be easily deleted and not submitted to the SEC and, therefore, would not be available to the public.

Figure 5:
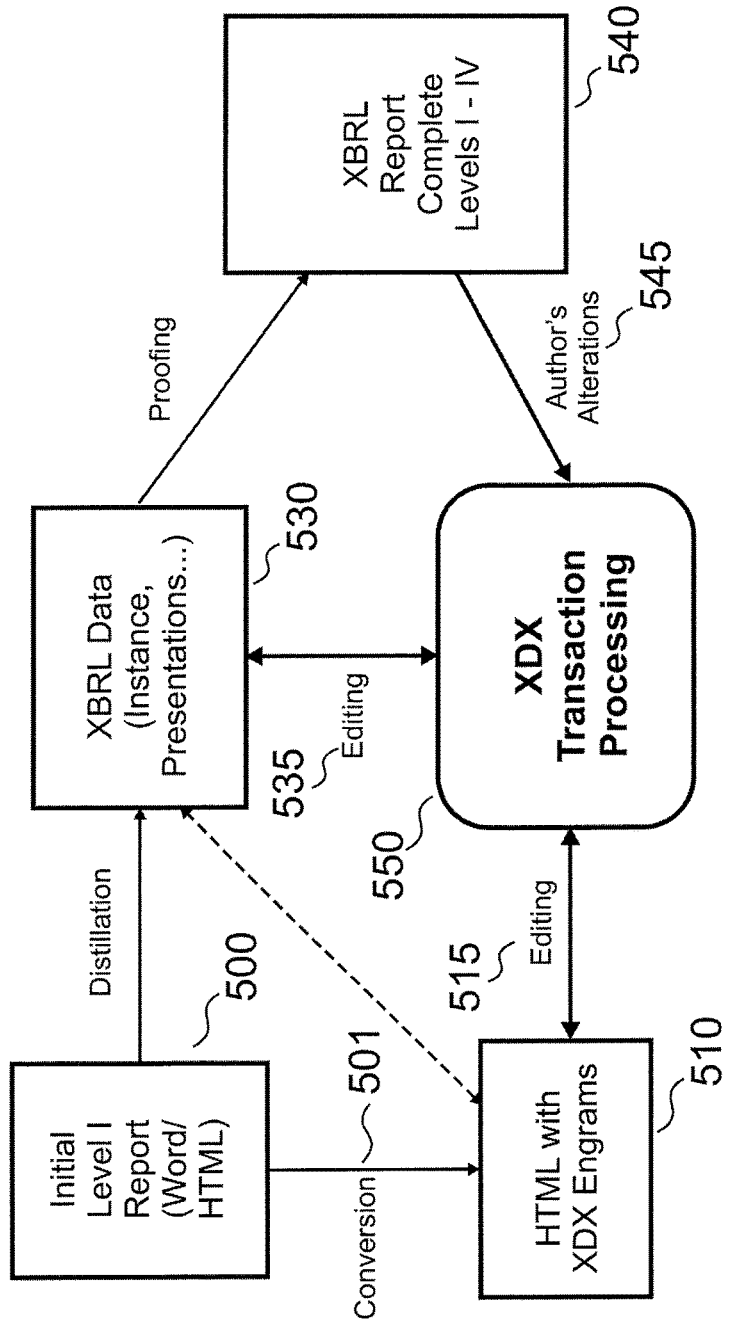
FIG. 5 shows a general flowchart of an exemplary XDX processing procedure.

With respect to FIG. 5, the XDX Transaction Processing 550 synchronizes engrams (ID tags) in intermediate HTML-format reports 510 with identifier tags in XBRL-format reports 530 either through an editing process 515 or a later synchronization editing process 535. The XDX Transaction Processing 550 also synchronizes an author's alterations 545 made in any Level of the report 540 to produce an edited level III/IV XBRL report 530. The initial engrams and ID tags in HTML are assigned either manually before conversion 501 or are derived by XDX in the conversion process 501 from the initial Level I report 500 to HTML with XDX engrams 510. XDX employs the HTML ID attribute to place engrams within the document structure. Such attributes are inert, in that they do not interfere with the normal display of HTML in browsers, and follow the conventional rules for HTML as established by the World Wide Web Consortium ("W3C"). In some cases, engrams will contain explicit XBRL information while in other cases, the information's coding may be implied. XDX engrams assigned as described herein may contain exact copies of XBRL or they may be expansions of the XBRL tags that contain added information such as contextual or label role information. For example, a column of figures, i.e., facts, within a table may belong to a specific XBRL context. Once an engram is in place for that column, all facts within that column would default to that specific XBRL context. An intersecting row containing an XDX engram would then provide for the accurate identification of one or more facts contained in that row. In addition, XDX engrams can identify specific label language or override a specific context for data contained in the marked region. As an example, in an original HTML document 309 (FIG. 3), a balance sheet may contain no XBRL information, although the titles and column headers in the overall containing text block may indicate the type of information to be tagged. By adding the XDX data as described above, each fact would be identifiable.

With reference to FIG. 6 which illustrates a Level I text block, the Level I definitions in a report encompass only the top-level text blocks in the report. In FIG. 6, the entire note 310 is identified as a text block, with no further structure marked in note 310. When the XDX processing handles the report, it first assigns a text block engram to note 310, here shown as the value of an HTML ID tag "xdx_80_EarningsPerShareTextBlock" in the HTML paragraph definition for the title line of the note (this could easily be any number of HTML tags such as headings or various divisions). The identifying engram code here is XDX_80, which, as in all instances of identifying engram codes described herein, is used later to identify that text as a block to the XDX processor.

With reference to FIG. 7, for tables within the report, XDX assigns an engram to each table 740 (also in FIG. 2) to generate a Level III fact. A table 740 may also lie within a text block 310. The ID tag engram for table 740 is shown here as "xdx_88" SUMMARY="xdx: Disclosure—Basic and Diluted Earnings Per Share (Detail)". The identifying engram code here is XDX_88.

With reference to FIG. 8, for columns within the report, XDX assigns an engram to each column 850 at Level IV. A column 850 may also lie within a table 740. The ID tag engram for column 850 is shown here as "xdx_49_c20110101_c20110331". Note the coding of the column header date range in the ID tag: "20110101_20110331", meaning the date range beginning Jan. 1, 2011 and ending Mar. 31, 2011. The identifying engram code here is XDX_49.

With reference to FIG. 9, for rows within the report, XDX assigns an engram to each row label 910 at Level IV. A row label 910 may also lie within a table 740. The ID tag engram for row 910 is shown here as "xdx_40C_NetIncomeLoss". The identifying engram code here is XDX_40. Note the use of a qualifier in the XDX engram code itself, 40C, to distinguish multiple copies of the same engram in the same context and table.

With reference to FIG. 10, for facts 245 within the report, XDX uses a combination of engrams assigned to text block 310, table 740, column 850, and row 910 to locate a given fact 245. No additional engrams and IDs are required at this level, since each fact can be uniquely identified by the row, column, table, and text block in which it appears. As an example of the engram assigned to text block 310, XDX searches for "EarningsPerShareTextBlock", shown at the top of FIG. 10 to find that text block. XDX also accommodates facts 245 and other narrative details 311 (FIG. 10) embedded in textual information 310 (FIG. 10) in a report. This accommodation uses XDX ID tags and engrams within HTML statements that may be inserted and maintained in conventional HTML text streams. An example:

. . . text . . . <A ID="xdx.sub.--90 $_{13}$ Notes.sub.--20120331">1.76</A>. . . text . . . where the value 1.76 is a fact 245 (FIG. 10) embedded in the narrative text 311 (FIG. 10), and the <A ID=. . . ></A> is the XDX HTML.

Level II engrams operate in the same manner as Level I text block engrams. Each policy within the Level I disclosure is identified by a Level II engram. Through the use of XDX, communication of changes is facilitated among parties during report authoring and preparation. The basic flow of adding embedded information is from a draft report in a Level I form through forms in Levels II, III, and IV as shown in FIG. 3. Any party to the authoring and preparation stages may correct contents of the report, or add or delete report content, as shown in FIG. 4. Any such change to the report must be applied to all instances where the changed data appears in the report to allow review by other parties at these stages. By the assignment of engrams within a report, changes to report information are updated though all instances in the report and easily communicated to all parties requiring review of such changes before report submission. Engrams could also be carried outside the realm of HTML and back via methods other than the HTML ID. For example, engrams could be carried into and from Microsoft Word via bookmarks, hidden text, or comments. Other tags and features in HTML are used for storing and retrieving contextual or structural information. For example, the <table> element of HTML has a SUMMARY tag, which is intended to contain free-form text characterizing the table as a whole. XDX stores engrams to incorporate XBRL presentation data in the SUMMARY value. Another often-used HTML feature is the comment, which contains data not visible to browsers for processing, and which XDX can use to embed information concerning the reports it is processing.

Engram identifiers can range from those conveying simple information such as "this identifies a level 1 fact" to those communicating complex information such as "the data in this row is connected to XBRL element xyz, is indented at this level and has a negated role". An engram may also identify a contiguous grouping of textual data. Each engram starts or stops the group of data belonging to a particular fact or element. In many cases the scope of the data is defined by the type of XDX code used in the engram's identifier. An engram may contain one or more parameters. Depending on the XDX code used in the engram's identifier, an engram may have more than one parameter and may contain more than one code. For example, an engram may not only identify an XBRL element, but may also carry fact characteristics such as "units", "precision", etc. An engram may be self-checking. Engrams can contain an optional check code, for example a textual checksum, to verify integrity. An engram is uniquely identified. Engrams must be unique both to be able to identify a specific piece of information within an entire document, and to avoid violating any name space rules as defined by HTML specifications and the W3C. Engrams can be loosely nested. Engrams can contain other engrams and may continue to apply to a region of text until revoked or replaced by a new engram of the same level.

The format of the XDX engram identifier is as follows:
xdx_ffuuc_param1_param2
where:
  xdx Designates ID as an XDX engram.
  ff Is the functions code.
  uu is a uniqueness character or characters to insure that engrams in the HTML. IDs in the XML name space must be unique.

c is an optional check code to verify the integrity of the overall engram. If the check code is not used, it should be set to '_' to indicate clearly that a check code in not in use.

param1_param 2 . . . are any associated parameter data, one or more, used to refine the engram.

Figure 11:
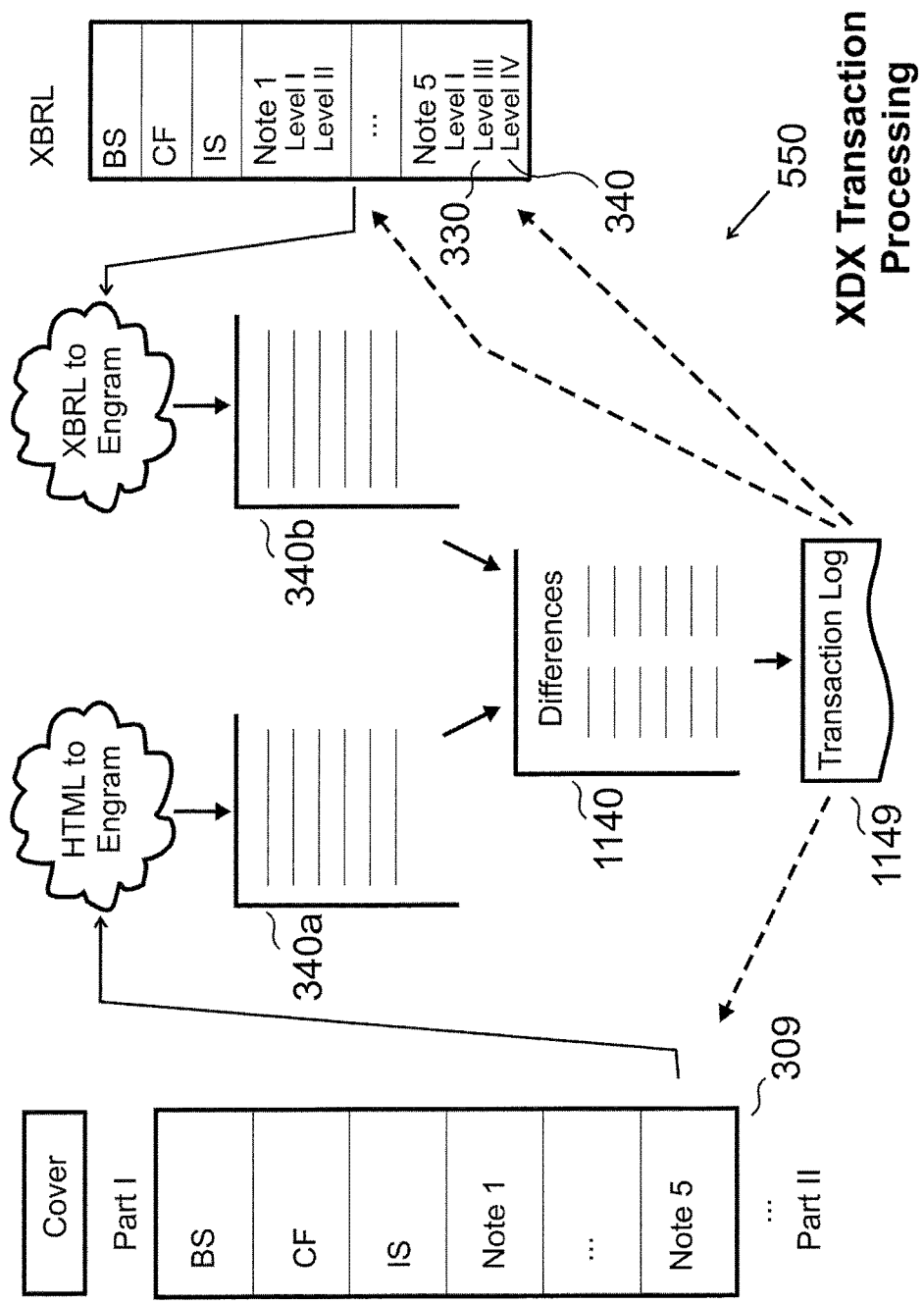
FIG. 11 shows an exemplary process of synchronizing HTML and XBRL using XDX Engrams.

FIG. 11 shows an overview of XDX processing and report reconciliation. The process can be automatically started by the editing software or engaged by the user when they complete editing of a component of the overall HTML/ XBRL data. The XDX synchronization process converts the HTML report 309, which may include a balance sheet (BS), cash flow statement (CF), income statement (IS), and notes 1 . . . n as narrative text 311 (FIG. 2), into a common format 340*a* wherein the report is broken down into sections each having an individual engram assigned thereto. The XDX process converts the XBRL Level IV form 340 or the Level III form 330 of the same report into the common format 340*b* similarly broken down into sections each having an engram assigned thereto to be used for comparison to report 340*a*. XDX then compares reports 340*a* and 340*b* to produce a set of differences 1140, converting said differences into a transaction log 1149. Since the same fact could potentially appear in many places, the log will contain the location of each area to be adjusted to update the fact. Finally, the XDX process applies transaction log 1149 to HTML report 340*a* and/or XBRL report 340*b* to produce consistent, synchronized, updated versions of the same report. Depending on the origination of the change, the transaction log will be applied appropriately. For example, a change to a Level IV number will result in transaction log entries to update the XBRL Level I and III 330 and the HTML 309. Alternatively, a change in facts within the HTML 309 will flow to multiple levels of XBRL 330/340.

Each engram from the HTML-from-XDX report copy 340*a* is matched to its corresponding engram in the XBRL-from-XDX copy 340*b* for the same report, producing engram-level differences in difference file 1140. The same matching process is performed for report copies in HTML-from-XDX form or in XBRL-from-XDX form, enabling a complete range of comparison and audit capabilities using the identifying engrams in both forms. XBRL labels are normally stored within the HTML text stream as normal text. Since the label is normally part of the text stream, it can be edited and processed like any other text within the HTML version of a financial report. The text following an element designation becomes the XBRL label. For example, a table row with an XDX XBRL element engram will have the label as set within the first cell, the or line item stub 242. Similarly, a fact in the form of a text block will, by default, detect the label as the text contained in the HTML block having the XDX engram.

Figure 12:
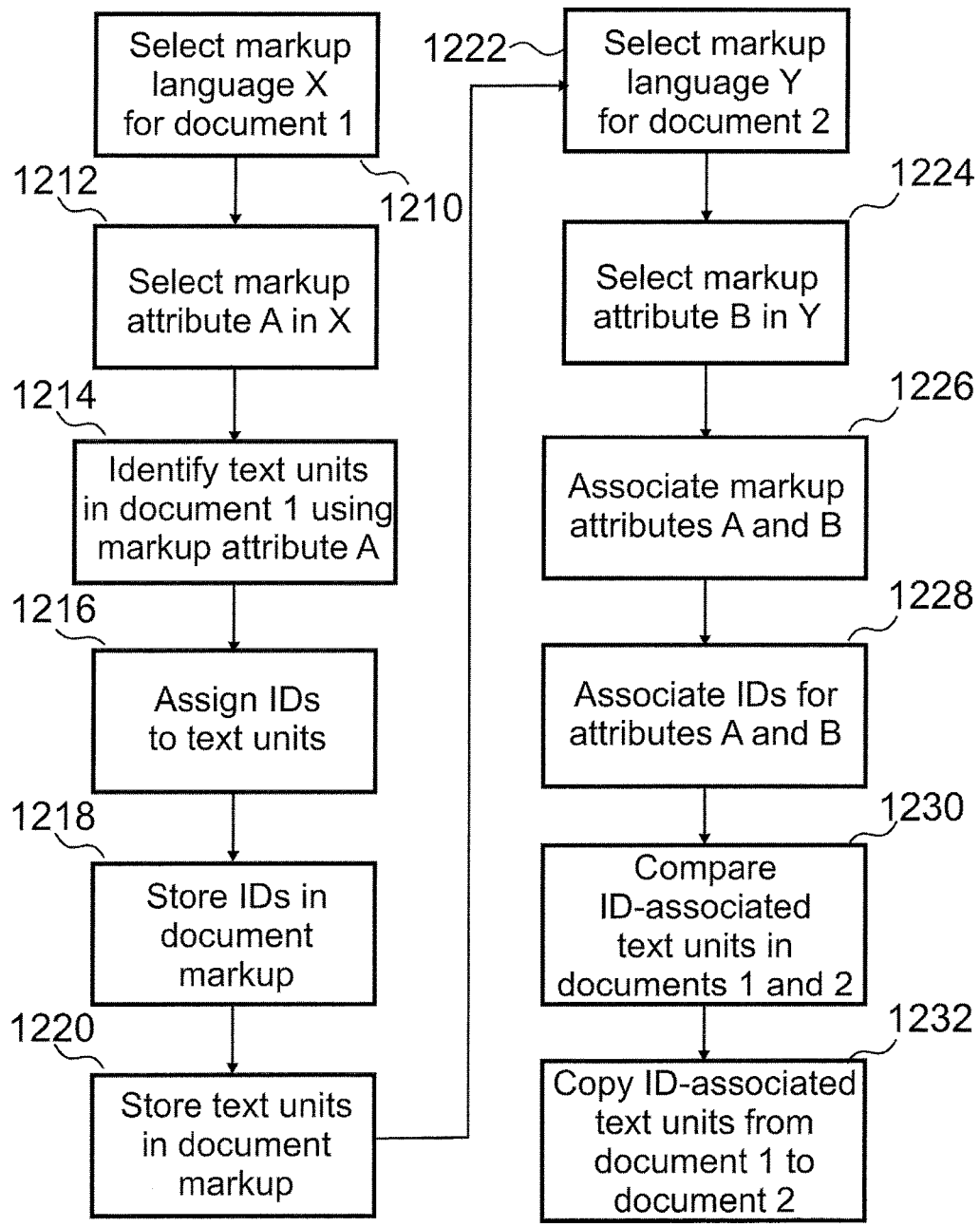
FIG. 12 illustrate an exemplary processing workflow flow to implement and use XDX.

To further refine the identification of label text, a label may be designated by a specific XDX code placed inline. While such engrams can be attached to any inline element, authors may use the HTML <A> element to avoid having engrams being discarded by any style functions within the hosting application. In the XDX process steps illustrated in FIG. 12, the identifier values are the XDX engrams. Referring to FIG. 12, at step 1210, a markup language is selected which is commonly, but not restricted to, either HTML or XBRL as a first representation of digitally-marked-up financial data. At step 1212 a markup attribute is selected which, as described herein, is commonly the "ID" attribute of HTML, from the set of attributes used in the document in the first representation of digitally-marked-up financial data. At step 1214 an identifier value is assigned to each item or unit of textual information in the first representation of digitally-marked-up financial data using the user selected markup attribute. At step 1216 the identifier values are assigned to the first attribute in the first representation of digitally-marked-up financial data, thereby identifying each text unit in the document. At step 1218 the identifier values of the first attribute are stored in the marked-up document which is the first representation of digitally-marked-up financial data. At step 1220 the items or units of textual information to which the identifier value is assigned are stored in the marked-up document. At step 1222 another similar or different markup language, commonly, but not restricted to, either HTML or XBRL, is selected as a second representation of the digitally-marked-up financial data. At step 1224 a markup attribute, commonly an attribute or element in HTML or XBRL, is selected from the set of attributes used in the document in the second representation of digitally-marked-up financial data. At step 1226 the first markup attribute of the first representation is associated with the second markup attribute of the second representation. At step 1228 the identifier value of the first attribute is associated with the identifier value of the second attribute. Where a document in the second representation already exists, at step 1230 the item of textual information having the identifier value of the first attribute in the first representation is compared to the item of textual information having the associated identifier value of the second attribute in the second representation, thereby enabling validation, synchronization and correction of existing data. In all cases, at step 1232, the item of textual information having the identifier value of the first attribute from the first representation is written over, or replaces, the item of textual information having the associated identifier value of the second attribute in the second representation of digitally-marked-up financial data using the associated values assigned to the identifiers.

Figure 13:
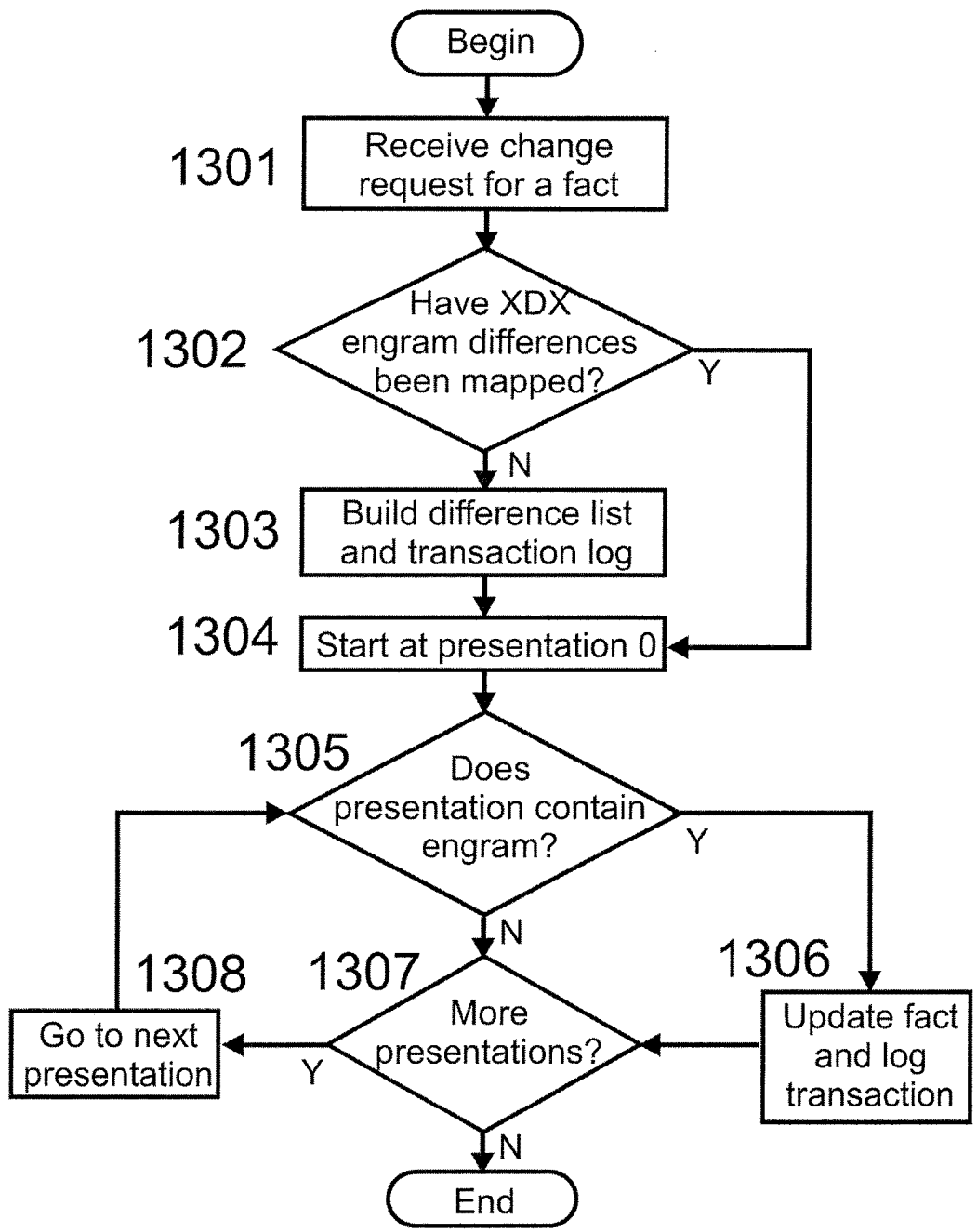
FIG. 13 summarizes an exemplary processing flow using XDX to update financial data elements in financial reports.

With reference to FIG. 13, an exemplary XDX algorithm for updating a changed data fact in two or more versions 340*a*, 340*b*, of a report is disclosed. The algorithm begins when a user, or an automated change performed under program control, selects a current data fact in one version of a report, e.g., the referenced data held in list 340*a* or 340*b*, and changes its value. This may be accomplished by the user scrolling through a report displayed on a monitor or other display screen connected to the computer system 100, and entering a change to a data value that is observed on the display, such as by using a keyboard or mouse connected to the computer system to enter the change, committing a series of changes as part of an editing session or invoked by some external system or change. XDX receives the request at step 1301, which may be transmitted as an input interrupt signal, for example, within computer system 100 which is executing the XDX program. At step 1302, in response to the request, XDX checks for the existence of a difference table 1140 generated as described with respect to FIG. 11 above, or, if not yet generated, XDX then generates the table and log, as described above, at step 1303. After the existence of the table and log is verified at step 1302, or generated at step 1303, the sections of the report, 340*a* or 340*b*, are checked one by one, represented as step 1304, for the existence of the engram which contains the changed fact. For the simplicity purposes, the HTML document 309 is treated as "presentation 0" while the remaining presentations are varying types of XBRL presentations ranging from statements through Levels I-IV. For example, at step 1305 the first presentation in the report is checked for the presence of the engram. If the presentation contains the engram, as verified by comparing at least two of its text block 310, table 740, column 850, and row 910 identifiers, the fact is updated at step 1306. If the presentation does not contain the engram, or if it was updated at step 1306, then, at step 1307, the report is checked whether there are more presentations to be updated. If there are more presentations to be updated/checked, the program accesses the next presentation at step 1308 and checks for the presence of the engram in the next presentation, at step 1305, as before. If there are no further presentations at step 1307, the update algorithm terminates.

XDX Engram Coding

XDX engram coding and processing provides for flexibility in how both computer readable elements and human readable labels. The following is a discussion of the XDX engram constructs used in the previously described processes.

Human readable labels may need stylistic impact for display within HTML that are meaningless or not appropriate for XBRL. For example, authors are encouraged to use CSS style (stylesheet) provisions to display labels in all capitals assuming the XBRL label is not all capitals. For example, the official HTML might be:

Note 1—Accounting Policies

Within the XBRL it may be desired to have the label as "Accounting Policies". To resolve this change, the CSS property for all capitals (text-transform: uppercase) may be specified rather than forcing the characters as uppercase by using HTML attributes inline. Alternatively, the HTML TITLE attribute can be used to specific a version of the label specifically for XBRL. The disadvantage behind this method is that the label is not readily editable or apparent to the user. There are no direct provisions in XDX to declare label roles. However, certain element designations, such as for table rows, may specify a negated presentation entry which will automatically set the label's role as "negated". With respect to uniqueness, the ID attribute used by XDX must be unique within the scope of each sub document, and preferably unique throughout the entire document. With respect to data types, between XBRL and various taxonomies there are many data types. For XDX and HTML, these are for the most part ignored. The data engram is assumed to be of the correct data type for the specified element.

The following table shows the presentation classes used and the corresponding types of XDX elements used for the classes, assuming that either the US-GAAP, Risk Return or any valid taxonomy as described by the XBRL specification is used. For the purposes of this section, US-GAAP means any XBRL taxonomy.

| Presentation | Principal Taxonomy | XDX Type |
| --- | --- | --- |
| Document and Entity Information | DEI | None |
| Statement | US-GAAP | Table |
| Disclosure Level 1 - Notes | US-GAAP | Block |
| Disclosure Level 2 - Policies | US-GAAP | Block |
| Disclosure Level 3 - Tables | US-GAAP | Block |
| Disclosure Level 4 - Detail | US-GAAP | Table |
| Disclosure Level 4 - Narrative | US-GAAP | Table |
| Risk Return Summary | Risk Return | Block (including embed) |
| Schedules (numeric) | Risk Return | Table |
| Schedules (graphic) | Risk Return | Graphic (hidden) |

XDX also works within taxonomies other than US-GAAP Levels I-II-III-IV which is presented herein in one embodiment as an illustrative mode and type of XDX operation. Examples of engrams of different styles include engrams for tables, contexts, and blocks. With respect to table-style engrams, for the SEC, statements are specific types of presentations that contain financial statements. Level IV tables contain similar data. Both are characterized by their content: largely numerical facts, multiple elements and one or more contexts (not defaulting to the report's context). In the HTML or XBRL table header, the HTML Table tag will contain the XDX engram for the table and the presentation name, along with dimension/role information. The presentation name is important to be able to connect the facts to a specific presentation. The presentation name is stored in the SUMMARY attribute of a table tag, for example:

<TABLE ID="xdx_302_134" SUMMARY="xdx: Disclosure - Earnings Per Share (Details)" CELLSPACING="0" CELLPADDING="0" STYLE="width: 100%; font: 10pt Times New Roman, Times, Serif">

With respect to context engrams, all facts are by default contained in the default context for the report. There may be many facts that do not fall into this category. Each context is characterized by a date and optional dimension-member pair or pairs. When defined within a table, the column or row where the engram appears sets the default condition for all the data. Rather than employing context IDs, XDX uses the raw context information to make the connection for an element-context fact pairing. The XDX context format takes the following form:

xdx_code_date_[date]_[dim_member] . . .

If the context is instant, then only a single date is provided. Dates are in the format yyyymmd. A default column context can be set using the XDX column context code. This usage will set the default context for a given column within a table unless overridden, i.e., by a subsequent setting. Block style engrams are characterized by defining an area within HTML by marking the start of an area and where necessary the end of the same area. Block engrams always contain text or table text block type facts. Since US-GAAP disclosures may contain other types of data groups, blocks will contain other blocks as well as tables.

The Level I disclosure may contain a large number of other engrams. Unless ended, a Level I engram mark will continue in effect until another Level I engram is encountered. By default the Level I fact is placed into the presentation by the same name as the label. Context information is not provided for Level I engrams and assumed to be the context of the report. Examples of Level I and Level II block engrams follow. Each example is headed by the XDX numeric function code, followed by the name of the function it serves.

80—XDX_NOTE_L1_BLOCK—this engram identifier marks the start of a text block fact for a Level I disclosure. If the label is not the entire block, an additional inline engram identifier will be used to mark the end of the text block fact. It is assumed that the first block of the disclosure also contains the label. There is one parameter in the block start engram: the element name Example:

<P ID="xdx_80_OrganizationConsolidationAndPresentation..." STYLE="text-align: center; margin: 6px 0pt 0pt; font: x-small Arial, Helvetica, Sans-Serif"><U>NOTE 1     ACCOUNTING POLICIES</U></P>

Note that the element containing the XDX engram is included in the fact.

81—XDX_NOTE_L1_BLOCK_END—this engram identifier marks explicitly the end of a Level I disclosure. Example:

<P ID="xdx_81" STYLE="margin: 0 pt;"> </P>
A Level 1 End Block is not required except for the last disclosure.

82—XDX_NOTE_L1_LABEL—this engram identifier marks the label portion of the block for a Level 1 fact. Its presence implies that the element specified was in the block. This can be attached to any inline element. Example:

<P ID="xdx_80_Organization..." ...><U>NOTE 1    
<A ID="xdx_82" STYLE="text-transform: uppercase">Accounting Policies</A></U></P>

Level II engrams operating in the same manner as do those in Level I. A Level I block or block end engram will close any open Level II engram. Level II engrams are automatically placed or attached to the "Accounting Policies (Policies)" presentation.

84—XDX_NOTE_L2_BLOCK—this engram identifier marks the start of a text block fact for a Level II disclosure. If the label is not the entire block, an additional inline engram will be specified. It is assumed that the first block of the disclosure also contains the label.

85—XDX_NOTE_L2_BLOCK_END—this engram identifier marks explicitly the end of a Level II disclosure fact. Example:

<P ID="xdx_85" STYLE="margin: 0 pt;"> </P>

A Level II End Block is not required except for the last fact. A Level II fact is automatically ended when a Level I fact begins.

86—XDX_NOTE_L2_LABEL—this engram identifier marks the label portion of the block for Level II. It is implied that the element is specified was in the block. This can be attached to any inline element. Example:

<P ID="xdx_84_BasisOfAccountingPolicyTextBlock" ...><I>Part 1 – <A ID="xdx_86">ACCOUNTING POLICIES</A></U></P>

The advantages of the use of the ID tag over its use of other tags for its engrams are the uniqueness of the ID tag across an entire document, and the pinpoint focus it provides for the facts, contexts, and structures in that document. In the end, Levels I-IV of a report must match across all presentations, and the use of the ID tag in its XDX processing makes that match much easier to achieve. Through the use of the ID tag by enhanced browser processing, the user may browse a financial report or style the report document for different presentations. The specific assignments of each engram to a corresponding identifier code value is shown herein to exemplify engram code assignments, and does not imply any limitation preventing the addition of new engrams and engram identifier codes. The ID tag and its associated data may be legally submitted as part of the official reporting document or as part of any Level I-III disclosure. The same is true for other XHTML tags such as SUMMARY, or comments. ID tags may also be translated to word-processor bookmarks, hidden text, comments, or other tags in order to preserve the tagging in external data. Such tagging allows the user of external data to connect directly to information in an XBRL report, or to derive a new XBRL report altogether.

XDX Overview

This overview portion of the detailed description describes the XBRL Data Exchange format (XDX) in a manner allowing users to both read and write XDX information. In a nutshell, XDX provides a simplified method of embedding XBRL intelligence into an HTML and other documents for the purpose of either creating new XBRL reports or interchanging information between HTML and XBRL. Since HTML can be encoded in to XBRL as TextBlock style facts and contain information also represented as numeric facts in the XBRL, XDX also provides an interchange method between dissimilar fact structures containing similar factual information.

The embedding of XDX information into HTML files principally exploits HTML attributes that are not presently used or required for disclosure of financial documents. Information can be stored in a number of manners but principally relies on the HTML namespace as access through the use of the ID attribute. In addition, this overview covers interchange and embedding with Microsoft Word as well as other third-party applications. This overview assumes the reader is familiar with both HTML and XBRL coding and terminology. It is not necessary to have a detailed understanding of XBRL XML coding, only concepts and financial tagging methods.

Same Data, Dissimilar Data Types

The principal problem of XBRL is that data within the model, as represented by "facts", can contain copies of other facts. The nesting of facts is apparent in FIG. 2, wherein the largest text blocks 310 at Level I 211 contain smaller text blocks at Level III 740, which in turn contain detailed facts at Level IV 245. As shown in FIG. 3, a large Level I text block 310 may contain two or more tables 330. Such tables 330 are broken out of the text block into two Level III table TextBlocks, an example 740 of which is shown in FIG. 7, and individual numeric facts are further broken out in Level IV, exemplified as 850 in FIG. 9. XDX provides a method of tagging data within the TextBlock facts that can be identified for creating or synchronizing other data sets. Within the HTML, various data segments are identified within XDX using the "engrams". Each HTML table is represented by columns and rows that are tagged with engrams for XBRL context and elements.

Engrams

XDX data is stored within HTML in the form of "engrams". Engrams allow information to be embedded within an HTML human readable document to identify or connect parcels of information to the XBRL data. Since HTML can be used to represent facts with an XBRL dataset, engrams can be used to cross identify numeric facts embedded within HTML and also represented as discrete facts within the XBRL instance. Engrams can range from simple information such as "this identifies a level 1 fact" to complex information such as "the data in this row is connected to XBRL element xyz, is indented at this level and has a negated role".

Engram Characteristics:
  An engram Identifies a Group of Textual Data—It will start or stop the group of data belonging to a particular fact or element. In many cases the scope of the data is defined by the type of XDX code.
  An engram can Contain One or More Parameters—Depending on the XDX Code, an engram could have more than one parameter and may contain more than one code.
  An engram is Self Checking—Engrams can contain an optional check code to verify integrity.
  An engram is Unique—Engrams must be unique to both be able to identify a specific piece of information and not violate any name space rules.

Engrams can be Loosely Nested—Engrams can contain other engrams and may continue to apply to a region of text until revoked or replaced by a new engram of the same level.

XDX Engram Format

Engrams are principally stored in the HTML ID attribute as well as the SUMMARY and in HTML comments. They can also be stored within the NAME attribute of the A element (anchor). The ID attribute has the added advantage of being available on nearly all HTML elements as specified by W3C HTML 4.01 Specification Section 7.5.2. The <A NAME> combination is a convenient way to transport document information to non-HTML platforms such as Microsoft Word in the form of "bookmarks".

Engram Format xdx_ffc[_param]

Where:

xdx Designates ID as an XDX engram.

ff Defines the engram type c Is a check code to verify the integrity of the overall engram.

param Is any associated data. Engrams can have up to twenty (20) parameters.

HTML Embed

XDX engrams are embedded in the HTML code at two basic levels. The first is via the ID attribute and the second is using HTML comments inside of a "field" code.

Example of an engram in an HTML ID:

<TR ID="xdx_40C_ProfitLoss_01_pn6n6" STYLE="vertical-align: bottom">

Fields define a method of structuring HTML comments in a manner similar to W3C CSS data. Information is in the form "property: value; property; value". The 'set' field is employed in these example since the field structure can be used by a number systems exploiting comments to carry data:

<!- - Field; Set; Name: xdx; ID: xdx_05_EntityCentralIndexKey_0000990681- ->

Engram structure is exactly the same and in fact is specified by the ID property rather than the HTML ID attribute.

Structure—Loose Text Grouping

By nature, XDX coding is grouped as a series of nested elements without having a strict structural enforcement. Document and XBRL structure in and of itself actually enforces the data structure. For example:

Document
Statement A
Statement B
Disclosure A (Level I)
Policy A-A (Level II)
Policy A-B (Level II)
Table A-A (Level III)
Detail A-A-A (Level IV)
Policy A-C (Level II)
Disclosure B (Level I)
Disclosure C (Level I)
Table C-A (Level III)
Detail C-A-A (Level IV)
Table C-B (Level III)
Detail C-B-A (Level IV)
Narrative C (Level IV)
Disclosure D (Level I)

For XDX, a Level I engram will start a section that may contain a series of additional engrams specifying deeper level if tagging. When information is parsed (gathered), the Level I aspect of the data, or rather, what becomes a Level I fact, will contain until another Level I engram is encountered or the Level I engram is explicitly closed. All engrams that contain TextBlock style data operates in the same manner.

Tables

Table can operate in a similar manner except rows and columns will define the default data attributes as intersected by the X/Y points of a table.

XBRL Data—Elements

The underlying concept that describes a financial figure or date. Elements must belong to a standard taxonomy for be defined by the user using an external XET or XFR file.

Contexts

Contexts are used to organize data into groups by dates or broad concepts. For example, a context could be a simple as the date Jan. 1, 2012 or as complicated as the period ended Dec. 31, 2012 for a subsidiaries restated financials. All contexts are required to have dates but the descriptive portion (known as dimensions) are optional. A dimension consists of an Axis element and a member element. Together they describe extended context information. For example, the axis may be an element that describes geographic locations where the member is a specific geographic location. This way many contexts that have the same Axis but different members can be used together to describe individual parts of a whole table.

Facts

The underlying information that makes up and XBRL data set is the "fact". While facts can be a number of data types, they are all characterized by (i) an element, (ii) a context and (iii) a unit designator. For XDX, the element and context can be defined in a number of ways. For example, in a standard table, each row with facts would be identified by an element while certain columns would contain context information. The intersection of the row and column defines a fact. If a fact was called out "inline", the engram would be required to carry both the element and the context. The display of facts is also controlled by precision and scale. These values are not relevant to text blocks but are quite important to numeric values.

Labels

XBRL labels are normally stored within the HTML text stream as normal text. Since a label is normally part of the text stream, it can be edited like any other text within the HTML version of a financial report. By implication, the text following an element designation becomes that label. For example, a table row with and XDX XBRL Element engram will by implication have the label as set within the first cell, the stub. Similarly a fact as disclosure text block will by default detect the label as the text contained in the HTML block with the XDX engram. To further refine the identification of label text, a label may be dictated by a specific XDX code placed inline. While such engrams can be attached to any inline element, authors should use the HTML <A> element to avoid having engrams being discarded by any style functions within the hosting application. Authors are encouraged to use CSS style provisions to display labels in all capitals assuming the XBRL label is not all capitals. For example, the official HTML:

Note 1—Accounting Policies

Within the XBRL it maybe desired to have the label as "Accounting Policies". To resolve this change, the CSS property for all capitals (text-transform: uppercase) rather than forcing the characters as uppercase. Alternatively, the TITLE attribute can be used to specific a version of the label specifically for XBRL. The disadvantage behind this method is that the label is not readily editable or apparent to the user.

There are no direct provisions in XDX to declare label roles. However, certain element designations, such as for table rows, may specify a negated presentation entry which will automatically set the label's role as "negated".

Data Types

Between XBRL and various taxonomies there are many data types. For XDX and HTML, these are for the most part ignored. The data engram is assumed to be of the correct data type for the specified element.

XDX Codes—Purpose

XDX engrams are the heart of interconnecting data between HTML and XBRL and external sources. This section discusses the individual XDX codes that can be employed within a document.

Codes and Parameters—Overview

Each XDX engram consists of a code and optional parameters. Parameters contain a prefix followed by certain formatted data. For example, the 'p' prefix indicates that the parameter contains precision information.

The prefixes are as follows:

| | |
|---|---|
| c | Defines context information. |
| d | Defines the display type for numeric facts. |
| e | Defines the element. This is implied as the first parameter for many engrams. |
| p | Defines element presentation information. Defines the precision for the fact or area. |
| z | Defines a random identifier to make IDs unique. |

When reading the specification, any parameter that is listed with an I in front of the name can omit this type as it is implied by the engram type. Any parameter or parameter value that is listed with brackets [ ] around the name is optional. Parameters that contain the underbar (_) character should escape the character by using two underbars in a row. For example, the parameter "my_param" should be written as "_my_param".

The Check Code

The XDX coding consists of three characters, the last of which is a check code to verify the integrity of the engram. To omit the check code, simply replace it with an underbar (_).

Standard Values

Some values are in a standard format unless otherwise noted. The list of standard formats is as follows:

Dates

Dates are in the format of YYYYMMDD where Y is the year, M is the month and D is the day.

Standard Parameters

Some parameters are standard across engrams unless otherwise noted in the individual engram description. These parameters are defined as follows:

Element

This parameter describes an element. The value is the name of the element exactly as it appears in the taxonomy.

Element Presentation

This parameter describes how the element and data are displayed. The value is in the form:

i[nn][O]

where:

nn Defines the indent level. (optional)

O Represents options that can be any combination of the following: (optional)

N Negated on the XBRL presentation related to the current table.

B Block/Heading line that will appear as an abstract element.

H Date Heading that is for internal use only.

T Total line.

I Instant period

S Use beginning period matching.

E Use ending period matching.

C The row has a calculation but the calculation is not stored in the row engram.

Examples:

i02TC—Indented to level 2 with a total line and a calculation.

i01S—Indented to level 1 with a period match beginning iB—An abstract element heading.

Precision

This parameter describes the fact precision. The value is in the form:

ps[Precision]s[Power]

where:

s Defines the sign of the Precision or Power as follows:

n Negative p Positive i Infinite

Precision The value for precision from 0 to F in hexadecimal. If sign is type i no value should be specified.

Power The value for power from 0 to F in hexadecimal. If sign is type i no value should be specified.

Examples:

pii—Fact is as precise as written and value will be interpreted as is.

pn3n3—Fact is precise to thousands and the value will be multiplied by 1000 to create the fact.

Context

This parameter describes a context. The value is in the form:

Start[_End][[_Axis][_Member][_Axis][_Member] . . . ]

where:

Start The first date for the context. This is the instant date of the context if End is not present; otherwise it is the starting date.

End The second date for the context. This is always the end date if present.

Axis Element name as it appears in the taxonomy to be used as the dimension of the context. Must be used in conjunction with a Member to form a pair. Can be repeated.

Member Element name as it appears in the taxonomy to be used as the segment of the context. Must be used in conjunction with a Axis to form a pair. Can be repeated.

Examples:

20120101_20121231—From Jan. 1, 2012 to Dec. 31, 2012

20121231_StatementGeographicalAxis_US_Statement-BusinessSegmentsAxis_information TechnologyMember Information Technology in the United States as of Dec. 31, 2012

CIKs are usually part of a context but they are not employed within XDX. This is because the SEC does not support more than one CIK so the CIK only needs to be specified once for the report.

Display
  This parameter describes how the written value should be interpreted when creating a fact or how the fact should be written into the document. The value is in the form:
  dO
  where:
    O Represents options that can be any combination of the following:
      p Interpret value as a percent. (ie. 5.06%)
      c Interpret value as a cardinal number. (ie. six)
      m Interpret value as a mixed cardinal number. (ie. 5.6 billion)
      o Interpret "no" as 0.
      n Interpret "none" as 0.
      i Invert the value before creating fact (ie. 5 becomes −5)
      d Interpret value as a date.
      s Use negative sign when writing a negative value. This is normally assumed to be in accounting format which uses parenthesis for negative numbers.

Control and Utility Engrams—Overview

Certain information contained within a XBRL report does not have an analog in the official HTML. These items require a number of engrams to be placed at header of the document. In MS word are carried as hidden text at the start of the document. The following is an example header information:

```
<!-- Field: Set; Name: xdx_link; Data: my_xfr.xet -->
<!-- Field: Set; Name: xdx_link; Data: my_xfr.xfr -->
<!-- Field: Set; Name: xdx; ID: xdx_02_us-gaap-2012 -->
<!-- Field: Set; Name: xdx; ID: xdx_03_abc_abc123456_20120603 -->
<!-- Field: Set; Name: xdx; ID: xdx_04_20120101_20120603 -->
<!-- Field: Set; Name: xdx;
ID: xdx_05_EntityCentralIndexKey_0000990681 -->
<!-- Field: Set; Name: xdx;
ID: xdx_05_CurrentFiscalYearEndDate_12-31 -->
```

Engrams
02—XDX_TAXONOMY
  Specifies the default taxonomy for the report. The name is a shorthand as specified below.
  Parameters:
  Taxonomy, [Optional Taxonomy, . . . ]
  Example:
  <!- - Field: Set; Name: xdx; ID: xdx_02_us-gaap-2012- ->
  Where Taxonomy is of the form: [Namespace]-[Year]
  Namespace Is one of the following:

|      | US-GAAP |
|------|---------|
|      | RR      |
| Year | The taxonomy year in YYYY format. |

Where Optional Taxonomies can be one or more of the following:

| Country  | The country list for this taxonomy year (if any)  |
| Currency | The currency list for this taxonomy year (if any) |
| Invest   | The investment taxonomy extensions                |

03—XDX_NAMESPACE
  Specifies the namespace for the report. The namespace is required to export an XBRL file.
  Parameters:
  Identifier, Domain, Date
  Example:
  <!- - Field: Set; Name: xdx; ID: xdx_03_abc_abc123456_20120603- ->
  Where Identifier is a unique short name of the company (such as a stock ticker)
  Where Domain is the web domain of the company or the same as Identifier
  Where Date is the date on which the taxonomy was published.
04—XDX_REPORT_PERIOD
  Specifies the reporting period.
  Parameters:
  Start Date, End Date
  Example:
  <!- - Field: Set; Name: xdx; ID: xdx_04_2012010_120120603- ->
  Where Start Date is the first day of the reporting period
  Where End Date is the last day of the reporting period
  For Risk Return reports these dates can be the same.
05—XDX_DEI_FACT
  Specifies the reporting period.
  Parameters:
  I Element, Value
  Example:
  <!- - Field: Set; Name: xdx; ID: xdx_05_EntityCentralIndexKey_0000990681- ->
  Where Element is the element used to report the DEI fact.
  Where Value is the fact value.
    The context of a Document and Entity Information fact is the reporting period. For facts that are not the reporting period but are DEI facts should be encoded using the Level 4 XDX codes.

Table Engrams—Overview

For the SEC, statements are specific types of presentations that contain financial statements while Level 4 tables also contain similar data. Both are characterized by have largely numerical facts, multiple elements and one or more contexts (not defaulting to the report's context).

Generally, facts within an table are represented as rows and columns Facts are discerned by the intersection of row and column along with default information as provided for the entire table. Table are in general analogous to one or more presentations. Certain presentation characteristic are supplied and apply to all the facts within a table with table unless overridden for that fact.

Presentation information can also be gleaned directly from an XDX coded table. Various element definitions will provide data with respect to XBRL label roles, indenting, total attributes and other information.

Table Header
  The HTML Table tag will contain a number of XBRL data items. First, it will contain the XDX ID for the table, second, it will contain the presentation name. There are several XDX table engram types.

Presentation Name
  The presentation name is important to connect the facts to a specific presentation.
  The presentation name is stored in the SUMMARY attribute of a table tag, for example:

```
<TABLE ID="xdx_102_134" SUMMARY="xdx: Disclosure - Earnings Per Share (Details)" CELLSPACING="0" CELLPADDING="0" STYLE="width: 100%; font: 10pt Times New Roman, Times, Serif">
```

30—XDX_PRESENTATION
  This will start a presentation for the statement. The label if present will be in the summary for the table.
  Parameters: Presentation Type, [Precision]
  Example:

<TABLE ID="xdx_30F_111" SUMMARY="xdx: Statement - Condensed Consolidated Balance Sheets">

Where Presentation Type must be one of the following:

| | |
  |---|---|
  | 0 | Unknown or not set |
  | 101 | Document and Entity Information |
  | 111 | Statement - Balance Sheet |
  | 112 | Statement - Cash Flows |
  | 113 | Statement - Operations |
  | 114 | Statement - Changes in Equity |
  | 121 | Parenthetical - Balance Sheet |
  | 122 | Parenthetical - Cash Flows |
  | 123 | Parenthetical - Operations |
  | 124 | Parenthetical - Changes in Equity |
  | 131 | Disclosure - Accounting Policy |
  | 132 | Disclosure - Text |
  | 133 | Disclosure - Table |
  | 134 | Disclosure - Detail |
  | 135 | Disclosure - Narrative |

Where Precision is the precision information for the entire table. Note that rows and columns can override this value as needed.

88—XDX_NOTE_L3_TABLE
  This engram serves two purposes. First it sets the entire table as a level 3 fact. Second it will start a presentation for the level 4 facts in the table. The label if present will be in the summary for the table.
  Parameters: I Element, [Precision]
  Example:

<TABLE ID="xdx_88_ScheduleOfSegmentReportingInformationBy-SegmentTextBlock" SUMMARY="xdx: Disclosure - Segment Reporting - Operating segment revenues and profitability (Details)">

89—XDX_NOTE_L3_BLOCK
  This engram serves two purposes. First it sets the area between this engram and the close engram (XDX_NOTE_L3_BLOCK_END) as a level 3 fact. Second it will start a presentation for the level 4 facts in the area. The label if present will be in the summary of the first table.
  Parameters: I Element, [Precision]
  Example:

<TABLE ID="xdx_89_ScheduleOfAccountsReceivableSalesTable-TextBlock" SUMMARY="xdx: Disclosure - Receivables, Net - Schedule of accounts receivable sales (Details)">

8A—XDX_NOTE_L3_BLOCK_END
  This engram marks the end of a level 3 block fact.
  Parameters: None
  Example:
  <p id="xdx_8A_" style="font: 9 pt/120% Arial, Helvetica, Sans-Serif;">
Table Columns
  Table columns are the equivalent to contexts. For non-dimensional tables, the column engram will set the default context for all facts in a column. There are three types of column engrams that can be used to express data in a number of formats.

48—XDX_TABLE_COLUMN_ELEMENT
  This engram is used to define a column within a table where the axis are swapped and the row specifies the context and the column specify the element. The engram also specifies presentation information for indents, abstract and other information.
  Table Column Element will work with only the Table Row Context engram (XDX_TABLE_ROW_CONTEXT).
  Parameters: I Element, I Element Presentation, [Precision], [Display]
  Example:

<tr><td id="xdx_48_FinancingReceivableRecordedInvestment-Current_pn6n6">
  <td id="xdx_48_NotesReceivableNet_pn6n6">
  </tr>

Where Element is the element used to report any facts in this column.
  Where Element Presentation is the presentation for this column.
  Where Precision is the precision information for this column.
  Where Display is the display information for this column.

49—XDX_TABLE_COLUMN_CONTEXT
  This will set the default context for the column. This engram is generally used on standard non-dimensional tables where the column specifies the context.
  Table Column Context will only work with the Table Row Element engram (XDX_TABLE_ROW_ELEMENT).
  Parameters: Context*
  Example:

<tr><td id="xdx_49_20120101_20121231">
  <td id="xdx_49_20110101_20111231">
  </tr>

Where Context is the context for facts in this column.
  Because the format of this parameter may have many underbar characters the escaping of the underbar character should be skipped. Also, the identifier for the parameter type should be omitted. See the sample above for the correct formatting.

4B—XDX_TABLE_COLUMN_DIMENSION
  The engram specifies the second part of the fact's context which will be used for every fact in this column. This part of the context combined with the first part specified on a row can be used to create a complete context. This means that the completed context has the same date for each item in the row but different members for each column. The layout for most stockholder's equity tables would require the use of this engram.
  Table Column Dimension engram must be used in conjunction with the Table Row Date engram (XDX_TABLE_ROW_DATE). This combination of the two engrams is required to create a complete context. It can also be used with the standard Table Row Element engram (XDX_TABLE_ROW_ELEMENT).

Parameters: Partial Context*
Example:

```
<tr><td id="xdx_4B_StatementGeographicalAxis_US">
<td id="xdx_4B_StatementGeographicalAxis_CA">
</tr>
```

Where Partial Context is only the axis/member portion of the context needed for facts in this column.
Because the format of this parameter may have many underbar characters the escaping of the underbar character should be skipped. Also, the identifier for the parameter type should be omitted. See the sample above for the comet formatting.

Table Rows

Table rows are the equivalent to presentation line items. For non-dimensional tables, the row engram will set the default element for all facts on a row. There are three types of row engrams that can be used to express data in a number of formats.

40—XDX_TABLE_ROW_ELEMENT

This will set the default element for the row. This engram is generally used on standard non-dimensional tables where the column specifies the context. The engram also specifies presentation information for indents, abstract and other information.

Table Row Element will work with both Table Column Context engram (XDX_TABLE_COLUMN_CONTEXT) or Table Column Member engram (XDX_TABLE_COLUMN_DIMENSION) (if a row date is specified prior to the first this row element).

Parameters: I Element, I Element Presentation, [Precision], [Display]
Example:

```
<tr id="xdx_404_RestructuringChargesEquityMethod-
Investment_01N_pn6n6_di" style="vertical-align:
bottom; background-color: White">
<td ... >
<td ... >
</tr>
```

Where Element is the element used to report any facts on this row.
Where Element Presentation is the presentation for this row.
Where Precision is the precision information for this row.
Where Display is the display information for this row.

41—XDX_TABLE_ROW_CONTEXT

This engram is used to define a row within a table where the axis are swapped and the row specifies the context. The columns will specify the element to be used.

Table Row Context will only work with the Table Column Element engram (XDX_TABLE_COLUMN_ELEMENT).

Parameters: Context*
Example:

```
<tr id="xdx_41D_20101231_.... AndOtherServicesMember"
style="vertical-align: bottom; background-color: White">
<td ... >
<td ... >
</tr>
```

Where Context is the context for facts on this row.
Because the format of this parameter may have many underbar characters the escaping of the underbar character should be skipped. Also, the identifier for the parameter type should be omitted. See the sample above for the correct formatting.

43—XDX_TABLE_ROW_DATE

The engram specifies the first part of the fact's context which prevails within the table until another row date is encountered. Because the context persists until another date row is encountered, normal Table Row Element engrams can be used in between the date rows.

Table Row Date must be used with the Table Column Dimension engram (XDX_TABLE_COLUMN_DIMENSION). For more information on table layout see the Table Column Dimension engram description.

Parameters: Context, [Element], [Element Presentation], [Precision],[Display]
Example:

```
<tr id="xdx_43D_c20110101_20110331_eStockHolders-
Equity_i01S_pn6n6" style="vertical-align: bottom;
background-color: White">
<td ... >
<td ... >
</tr>
```

Where Context is the date for facts on this row that is combined with the dimension from the column.
Where Element is the element used to report any facts on this row.
Where Element Presentation is the presentation for this row.
Where Precision is the precision information for this row.
Where Display is the display information for this row.

Table Cells

98—XDX_BLOCK_FACT

This engram describes a fact within the report usually as part of a table that the dimensional structure does not match the HTML document at all.

Parameters: Element, [Element Presentation], [Precision], [Display], Context
Example:

```
<TD
ID="xdx_93_eRevenue_c20110101_20110331">1234<TD>
```

Where Element is the element used to report this fact.
Where Context is the context for this fact.
Where Element Presentation is the presentation information for this fact.
Where Precision is the precision information for this fact.
Where Display is the display information for this fact.

B0—XDX_DATA_SHEET_REF

This engram describes a link to a data sheet. Data sheets are unmapped XBRL files. This engram should not be used for most systems unless the user is switching between XBRL and another format that can provide editing.

Parameters: Reference
Example:

```
<TD
ID="xdx_B0_rF12345680000000300000003">1234</
TD>
```

Where Reference is the location of a unique cell in a data sheet.

Statements—Overview

Statements can be represented as one or more HTML tables. The starting table must have an engram to open and define the statement. Once defined, the statement continues until the end of the table. All facts defined while in the table will be placed on the resulting XBRL presentation.

Engrams

30—XDX_PRESENTATION

This will start a presentation for the statement. The label if present will be in the summary for the table.
Parameters: Presentation Type, Precision
Example:

```
<TABLE ID="xdx_30F_111" SUMMARY="xdx: Statement - Condensed Consolidated Balance Sheets">
```

Where Presentation Type must be one of the following:

| | |
|---|---|
| 0 | Unknown or not set |
| 101 | Document and Entity Information |
| 111 | Statement - Balance Sheet |
| 112 | Statement - Cash Flows |
| 113 | Statement - Operations |
| 114 | Statement - Changes in Equity |
| 121 | Parenthetical - Balance Sheet |
| 122 | Parenthetical - Cash Flows |
| 123 | Parenthetical - Operations |
| 124 | Parenthetical - Changes in Equity |
| 131 | Disclosure - Accounting Policy |
| 132 | Disclosure - Text |
| 133 | Disclosure - Table |
| 134 | Disclosure - Detail |
| 135 | Disclosure - Narrative |

Where Precision is of the form: p[s][Precision][s][Power]
s Sign: Must be n (negative), p (positive) or i (infinite)
Precision The value for precision from 0 to F in hexadecimal.
Power The value for power from 0 to F in hexadecimal.

Inline Engrams—Overview

Certain facts and information may need to be called out as inline or block that are not part of a table or level 1-3 definitions. There are two cases that this applies: (i) inline facts 245 for narrative 311 (FIGS. 2, 6 and 10) or other information (cover page) and; (ii) block items calling specific facts 245 out within a table 740 (FIG. 10).

Inline Facts

Inline engrams require both an element and a context.

90—XDX_INLINE_FACT

This engram describes a loose fact within the report. The HTML element must be an inline element such as an A tag or FONT tag.
Parameters: Element, [Element Presentation], [Precision], [Display], Context
Example:

```
<P STYLE="font-size: 14pt; font-weight: bold; text-align: center; margin-top: 0pt; margin-bottom: 0pt">FORM
<A ID="xdx_90_DocumentType">10-Q</A></P>
```

Where Element is the element used to report this fact.
Where Context is the context for this fact.
Where Element Presentation is the presentation information for this fact.
Where Precision is the precision information for this fact.
Where Display is the display information for this fact.

91—XDX_INLINE_LABEL

This engram describes a loose label within the report. The HTML element must be an inline element such as an A tag or FONT tag.
Parameters: Element
Example:

```
<P STYLE="font-size: 14pt; font-weight: bold; text-align: center; margin-top: 0pt; margin-bottom: 0pt">FORM
<A ID="xdx_91_DocumentType">Document Type</A></P>
```

Where Element is the element for which the label is required.

Block Style Engrams—Overview

Block engrams are characterized by defining the start of an area within HTML and optionally and the end of an area. Block engrams always contain text or table text block type facts. Since US-GAAP disclosures may contain other types of data groups, blocks will contain other blocks as well as tables.

Levels of Disclosure

There a four levels of disclosure. The first three levels apply to block style engrams. The behavior of each level is the same so only the first level's engrams will be described in detail. The block level disclosure engrams may (and will) contain other engrams. Unless ended, a level will continue until another level engram of the same level is encountered. For example, a once a level 1 engram is started it will continue until another level 1 engram is encountered. Even if there are level 2 of 3 engrams within the text. Context information is not provided for block engrams as it is assumed to be the context of the report.

80—XDX_NOTE_L1_BLOCK

This will start a text block fact for a Level 1 disclosure. If the label is not the entire block, an additional inline engram will be specified. It is assumed that the first block of the disclosure also contains the label.
Parameters: Element
Example:

```
<P ID="xdx_80_OrganizationConsolidationAndPresentation..."
STYLE="text-align: center; margin: 6px 0pt 0pt; font: x-small Arial,
Helvetica, Sans-Serif"><U>NOTE 1    
ACCOUNTING POLICIES</U></P>
```

Note that the element containing the XDX engram is included in the fact.

81—XDX_NOTE_L1_BLOCK_END

This will explicitly end a level 1 disclosure.
Parameters: None.
Example:
<P ID="xdx_81"STYLE="margin: 0 pt;"> </P>
A Level 1 End Block is not required except for the last disclosure.

82—XDX_NOTE_L1_LABEL

This will indicate the label portion of the block for a level 1 fact. This must appear inside of a level 1 disclosure.
Parameters: None.
Example:

```
<P ID="xdx_80_Organization..." ...><U>NOTE 1

<A ID="xdx_82" STYLE="text-transform: uppercase">Accounting Policies</A></U></P>
```

Level 2 Disclosure
Level 2 engrams operating in the same manner as level 1. A Level 1 block or end block engram will close any open Level 2 engram. Level 2 engrains are automatically placed or attached to the "Accounting Policies (Policies)" presentation.
84—XDX_NOTE_L2_BLOCK
This will start a text block fact for a Level 2 disclosure. If the label is not the entire block, an additional inline engram will be specified. It is assumed that the first block of the disclosure also contains the label. This engram matches the behavior of the Level 1 Block engram (XDX_NOTE_L1_BLOCK).
85—XDX_NOTE_L2_BLOCK_END
This will explicitly end a level 2 disclosure fact. This engram matches the behavior of the Level 1 Block End engram (XDX_NOTE_L1_BLOCK_END) except as a Level 2 fact is automatically ended when a Level 1 fact begins.
86—XDX_NOTE_L2 LABEL
This will indicate the label portion of the block for Level 2. This engram matches the behavior of the Level 1 Label engram (XDX_NOTE_L1_LABEL).
Level 3 Disclosure
Level 3 engrams operating in the same manner as level 1. A Level 1 block or end block engram will close any open Level 3 engram. Level 3 engrams are automatically placed or attached to a "(Tables)" presentation based on the last level 1 block.
88—XDX_NOTE_L3_BLOCK
This will start a text block fact for a Level 3 disclosure. If the label is not the entire block, an additional inline engram will be specified. It is assumed that the first block of the disclosure also contains the label. This engram matches the behavior of the Level 1 Block engram (XDX_NOTE_L1_BLOCK).
89—XDX_NOTE_L3_BLOCK_END
This will explicitly end a level 3 disclosure fact. This engram matches the behavior of the Level 1 Block End engram (XDX_NOTE_L1_BLOCK_END) except as a Level 3 fact is automatically ended when a Level 1 or a Level 2 fact begins.
8A—XDX_NOTE_L3_LABEL
This will indicate the label portion of the block for Level 3. This engram matches the behavior of the Level 1 Label engram (XDX_NOTE_L3_LABEL).
XDX Transaction Log Specification
General—Purpose
The XDX transaction log is a structured representation of changes made to a document with XDX technology. The transaction log contains only information that needs to be changed or is relevant to the process of changing the facts.
General—Format
The log format will be plain text with commands on single lines. The commands will be written in a way to match natural languages whenever possible. Any amount of spaces or tabs will be treated as a single space unless inside a quoted value. Line returns are special characters so data that contains them will need to be encoded. Data strings can be quoted. Inside the quotes actual quotes must be escaped by preceding them with a backward \ slash.
Command Groups
Commands are grouped into types that define what they affect in the XBRL. There are control commands, data commands and structural commands. The control commands do not apply any changes to the XBRL but rather set the state for any commands that follow. Data commands affect the XBRL data (facts, footnotes, precision, etc.). Structural commands edit the XBRL structure (presentation structure, calculations, context properties, etc.). Errors that occur while processing control commands may or may not prevent data and structural commands from being processed (depending on the error).
XDX Transaction Log Structure
Structure—Encodings
The transaction log format supports base64 encoded data. The encoded data block will be preceded by a comment marking the start of encoded data. The encoded data is read until an end comment or blank line is read.
Example Commands

```
SetPresentation Statement - Balance Sheets
SetElement CashandCashEquivalentsAtCarryingValue
SetContext Asof2012-03-31
SetFact 2000
SetContext Asof2011-12-31
SetEncoding base64
SetFact
   # Start
   MjEwMA==
   # End
...
```

XDX Transaction Log Commands
The format of the function definitions are as follows. The function name is first followed by any parameters to the function. Parameters are separated by whitespace. Parameters that are optional are indicated by square brackets [ ]. When more than one parameter is enclosed in square brackets the group of parameters are optional but must all be specified or not specified. Parameters that can be repeated are indicated by curly braces { }.
Control Commands—Set Presentation
Format: SetPresentation value
Value is the full name of a presentation in the report. While the presentation is not needed to create or update facts it will be used to determine the default properties of the fact including the precision and multiplication factors (if any).
If the presentation name is invalid processing of data commands will continue with the previous presentation selected. Any structural commands involving presentation changes (including calculations will fail.)
Set Element
Format: SetElement value
Value is the full name of an element in the report. This sets the element that will be used when adding or updating facts or calculations. If the element cannot be found all data manipulation commands will fail as well as any structural commands involving the element.
Set Context
Format: SetContext value
This sets the context that will be used when adding or updating facts. Value is the XDX value for the context. This begins with the specific date of the context in YYYYMMDD format or a range of dates in the format of YYYMMDD_YYYYMMDD where the first date is the start date and the second is the end date. It can then be followed by _dimension_member that specify any dimension and member combinations that apply to the context. The value may also be set to a special case of "-report-". This case indicates the context should be set to the primary context of the XBRL file. If the context cannot be found all data manipulation commands will fail as well as any structural commands involving the context.

Set Encoding
  Format: SetEncoding value
The value is an encoding type. Currently only two types are supported:
  none—data will not be encoded
  base64—data will be encoded using base64
An invalid value will result in the encoding being set to none.

Override Precision
  Format: OverridePrecision value
The value is the new precision to use (don't use presentation defaults). It must be a value between −15 and 15 inclusive. Negative values indicate rounded precision (ie thousands is −3). An empty value will remove the override.

Override Counted
  Format: OverrideCounted value
The value is the new counted as amount to use (don't use presentation defaults). It must be a value between −15 and 15 inclusive. Negative values indicate rounded precision (ie thousands is −3). An empty value will remove the override.

Override Unit
  Format: OverrideUnit value
The value is the name of the unit to use for upcoming SetFact calls. An empty value will remove the override.

Set Taxonomy
  Format: SetTaxonomy value
The value is the name of the taxonomy to be used for the report. This action should only appear once in a transaction log.

Data Commands—Set Fact
  Format: SetFact value
The current element and context will be used to create a fact with this value. The current value, if any, will be overwritten. To set a nil fact the value field must be blank. If an encoding is turned on a blank value indicates the value has been encoded and will follow this command. If any of the required state commands have not been set up or failed this command will fail.

Remove Fact
  Format: RemoveFact
The current element and context will be used to find a fact. If a fact exists using the element and context it will be removed from the report. If any of the required state commands have not been set up or failed this command will fail.

Add Reference
  Format: AddReference value
The current element and context will be used to add a footnote reference to an existing fact. If such a fact does not exist it will be created with a nil value. The current references, if any, will still remain. To set multiple references use the command multiple times. The value is the text of the footnote. If the footnote text is not in the report it will be added.

Remove Reference
  Format: RemoveReference
The current element and context will be used to remove all footnote references from an existing fact. If such a fact does not exist this command will be ignored. If all references to a footnote are deleted the footnote will be deleted.

Set Label
  Format: SetLabel value [role]
The current element and presentation will be used to set the label for the element on this presentation. If more than one label for this element exists on the presentation the role parameter will be used to determine which label is changed. The role field is the short name for the corresponding XBRL label role including standard, terse, verbose, total, beginning, ending, negated, negatedterse, negatedtotal, negatedbeginning, and negatedending. If the role value is not set or unrecognized it will be set to the default value of standard. If any of the required state commands have not been set up or failed this command will fail.

Set Cell by Reference
  Format: SetCellByReference id value
The id will be used find a unique cell within an XBRL spreadsheet. The ID consists of a three groups of eight hexadecimal characters. The first eight characters are a unique identifier for a presentation. The next two are the X and Y positions respectively. The value is the value to place in the cell. If an encoding is turned on a blank value indicates the value has been encoded and will follow this command.

Structural Commands—Add Presentation
  Format: AddPresentation name [precision power][root]
    [definition {dimension domain}[table][line]]
A presentation will be created with the specified name. Other options are default 'precision' for monetary facts, 'power' to produce multiple monetary facts by when entering data, 'root' for the presentation. The presentation dimensional information includes the definition for the axis matching, 'dimension' and 'domain' elements, as well as the 'table' and 'line' items elements. Up to 10 dimensions and domain elements may be added to a single presentation. If a presentation already exists with the same name it will be unchanged and a new presentation with the same name will be added with the above options.

Add Context
  Format: AddContext type start [end] [{dimension member}]
The context described by the properties above will be created. Valid types are Duration and Instant. The end date parameter must not be specified when the type is instant. The start and end parameters describe the period of the context and must be valid dates in YYYY-MM-DD format. The dimension and members are optional and describe any dimensional information for this context. Up to 10 dimensions and member elements may be added to a single context. If a context with the same properties already exists no context will be created. The context identifier will automatically be created based on the properties. If a context with the same identifier exists (and the properties are different) the context will still be created with a different identifier.

Remove Presentation
  Format: RemovePresentation name [deletefacts]
The presentation with the specified name will be removed from the report. The optional parameter deletefacts will cause all facts on the presentation to be deleted.

Remove Context
  Format: RemoveContext identifier
The context with the specified identifier will be removed from the report. All facts using this context must be removed prior to this call. Contexts that still contain data cannot be deleted from a report.

Create Element
  Format: CreateElement name properties
Create an element with the given name and properties. The name must follow the XBRL naming conventions and the properties are a 32-bit value that describes the element.

It will be understood that, although specific embodiments of the invention have been described herein for purposes of illustration and explained in detail with particular reference to certain preferred embodiments thereof, numerous modifications and all sorts of variations may be made and can be effected within the spirit of the invention and without departing from the scope of the invention. Accordingly, the scope of protection of this invention is limited only by the following claims and their equivalents.

What is claimed is:

1. A system comprising:
a data storage medium storing a computer program executable by a processor to:
   access a first presentation of a financial report, wherein the first presentation is configured in accordance with a plurality of submission requirements of a regulatory entity, wherein the regulatory entity comprises one of: (a) U.S. Securities & Exchange Commission; (b) a governmental entity; or (c) a non-governmental organization, the first presentation comprising:
      one or more narrative portions;
      one or more tabular portions; and
      a first digitally-marked-up architecture,
         wherein each of the one or more narrative portions and each of the one or more tabular portions comprises a first format, wherein the first format comprises the first digitally-marked-up architecture;
   access a second presentation of a plurality of detail portions, wherein the second presentation is configured in accordance with the submission requirements, the second presentation comprising a second digitally-marked-up architecture which is different from the first digitally-marked-up architecture, wherein each of the detail portions comprises a second format that differs from the first format, wherein the second format comprises the second digitally-marked-up architecture, the second digitally-marked architecture corresponding to a plurality of different levels of detail, each of the detail portions being associated with one of the different levels of detail;
   access a list of unique identifiers, wherein the list of unique identifiers is associated with the one or more narrative portions and the detail portions, wherein each of the unique identifiers comprises mapping information that avoids name conflicts, wherein each of the unique identifiers specifies a designated type of information, and each of the unique identifiers is present in: (a) at least one of the one or more narrative portions; and (b) at least one of the detail portions associated with the different levels of detail;
   process the unique identifiers to determine whether a first condition is satisfied, wherein the first condition is satisfied if:
      (a) at least one of the narrative or tabular portions of the first presentation comprises a first piece of information of a first one of the designated types of information;
      (b) at least one of the detail portions of the second presentation comprises a second piece of information of the first designated type;
      (c) the first piece of information is different from the second piece of information; and
      (d) the first piece of information has been input more recently than the second piece of information;
   in response to the first condition being satisfied, replace with the first piece of information, all instances of the second piece of information within the detail portions of the second presentation;
   process the unique identifiers to determine whether a second condition is satisfied, wherein the second condition is satisfied if:
      (a) at least one of the narrative or tabular portions of the first presentation comprises the first piece of information of the first designated type;
      (b) at least one of the detail portions of the second presentation comprises the second piece of information of the first designated type;
      (c) the first piece of information is different from the second piece of information; and
      (d) the second piece of information has been input more recently than the first piece of information; and
   in response to the second condition being satisfied, replace with the second piece of information, all instances of the first piece of information within the narrative and tabular portions of the first presentation, resulting in an updated first presentation that remains configured in accordance with the submission requirements upon completion of the replacement.

2. The system of claim 1, wherein:
the list of unique identifiers comprises an engram list; and
each of the first presentation, the second presentation, the updated first presentation, and the updated second presentation comprises a configuration that complies with the submission requirements even while incorporating a plurality of the unique identifiers.

3. The system of claim 2, wherein:
each of the one or more narrative portions comprises at least one sentence, the at least one sentence comprising a subject and a verb;
each of the one or more tabular portions comprises at least one table, the at least one table comprising one of:
   (a) a first structure comprising a plurality of rows and at least one column; or
   (b) a second structure comprising at least one row and a plurality of columns;
the first format comprises an HTML format;
the first digitally-marked-up architecture comprises an HTML architecture;
the second format comprises one of an XBRL format or an XML-based format; and
the second digitally-marked-up architecture comprises one of an XBRL architecture or an XBRL architecture.

4. The system of claim 1, wherein:
the first digitally-marked-up architecture specifies a plurality of different attributes, each of the attributes being associated with a data field;
the data storage medium stores an engram list associated with the first and second presentations of the financial report; and
the engram list comprises:
   the unique identifiers; and
   an association of each one of the unique identifiers with one of the attributes.

5. The system of claim 4, wherein:
each of the narrative portions comprises at least one sentence, the at least one sentence comprising a subject and a verb; and
each of the tabular portions comprises at least one table, the at least one table comprising one of:
   (a) a first structure comprising a plurality of rows and at least one column; or
   (b) a second structure comprising at least one row and a plurality of columns.

6. The system of claim 4, wherein each of the unique identifiers comprises an identifier value, wherein the identifier values are unique relative to one another.

7. The system of claim 6, wherein:
each of the first and second pieces of information comprises a fact comprising one of a numerical form, a date form, or a form of one or more words; and
the computer program is executable by the processor to generate a transaction log, wherein, with respect to the first and second conditions, the transaction log indicates each of the instances in which the first piece of information is different from the second piece of information.

8. A system comprising:
a data storage device storing a plurality of instructions, wherein the data storage device is accessible by at least one processor for purposes related to a financial report, the financial report comprising:
a report portion configured in accordance with a plurality of submission requirements of a regulatory entity, wherein the regulatory entity comprises one of: (a) U.S. Securities & Exchange Commission; (b) a governmental entity; or (c) a non-governmental organization, the report portion comprising a plurality of narrative sections, wherein the report portion and the narrative sections comprise a first tagged format, wherein the first tagged format comprises a first tagging architecture; and
a plurality of detail portions configured in accordance with the submission requirements, each of the detail portions comprising a second tagged format that differs from the first tagged format, the second tagged format comprising a second tagging architecture, wherein: (a) the second tagging architecture is different from the first tagging architecture; (b) the second tagging architecture corresponds to a plurality of different levels of detail; and (c) each of the detail portions is associated with one of the different levels of detail;
wherein the at least one processor is operable according to the instructions to:
access a list of unique identifiers, wherein the list of unique identifiers is associated with the narrative sections and the detail portions, wherein each of the unique identifiers comprises mapping information that avoids name conflicts, wherein each of the unique identifiers specifies a designated type of information, and each of the unique identifiers is present in: (a) at least one of the narrative sections; and (b) at least one of the detailed portions associated with the different levels of detail, wherein the unique identifiers comprise a first identifier associated with a first piece of information;
process the unique identifiers to determine a first quantity of any and all occurrences of the first identifier in the narrative sections;
process the unique identifiers to determine a second quantity of any and all occurrences of the first identifier in the detail portions;
determine whether there has been a change from the first piece of information to a second piece of information within any of the narrative sections or detail portions;
if the change occurred within at least one of the narrative sections before occurring within any of the detail portions, replace the first quantity of occurrences of the first piece of information in the detail portions, with the second piece of information; and
if the change occurred within at least one of the detail portions before occurring in any of the narrative sections, replace the second quantity of occurrences of the first piece of information in the narrative sections, with the second piece of information,
wherein, after any of the replacement steps are performed, the report portion continues to be configured in accordance with the submission requirements.

9. The system of claim 8, wherein:
the first tagged format comprises an HTML format;
the first tagging architecture comprises an HTML architecture;
the second tagged format comprises one of an XBRL format or an XML-based format; and
the second tagging architecture comprises one of an XBRL architecture or an XML-based architecture.

10. The system of claim 9, wherein the at least one processor is operable according to the instructions to perform the step of replacing each occurrence of the first piece of information regardless of whether the first piece has a word form or a numerical form.

11. The system of claim 8, wherein each one of the narrative sections comprises at least one sentence, the at least one sentence comprising a subject and a verb.

12. The system of claim 8, wherein:
the report portion comprises at least one table; and
at least one of the narrative sections is located adjacent to the table within the report portion.

13. The system of claim 12, wherein:
at least one of the detail portions comprises at least one tabular portion, the at least one tabular portion comprising a version of the at least one table of the report portion;
the version of the at least one table comprises one of:
(a) a first structure comprising a plurality of rows and at least one column; or
(b) a second structure comprising at least one row and a plurality of columns; and
the second piece of information is located within the version of the at least one table.

14. The system of claim 13, wherein the at least one processor is operable according to the instructions to perform a step due to the change occurring within at least one of the detail portions before occurring in any of the narrative sections, the step comprising replacing each occurrence of the first piece of information within the at least one table, with the second piece of information, wherein the step comprising using positional information that comprises an intersection of at least one of the rows with at least one of the columns.

15. The system of claim 8, wherein the at least one processor is operable according to the instructions to perform the replacement steps without requiring a user to visually search and visually discover outdated information.

16. The system of claim 8, wherein:
the submission requirements comprise a plurality of requirements of an Electronic Data Gathering, Analysis and Retrieval (EDGAR) system of the U.S. Securities & Exchange Commission.

17. A system comprising:
a data storage device storing a plurality of instructions, wherein the data storage device is accessible by at least one processor, the at least one processor being operable according to the instructions to:
access a list of unique element names, wherein the list of unique element names is associated with a plurality of narrative portions and a plurality of detail portions, wherein the detail portions are associated with a plurality of different levels of detail, wherein each of the unique element names comprises mapping information that avoids name conflicts, wherein each of the unique element names specifies a designated type of information, and each of the unique element names is present in: (a) at least one of the narrative portions; and (b) at least one of the detailed portions associated with one of the different levels of detail, wherein the unique element names comprise a first element name associated with a first piece of financial information;

use the list of unique element names to search within a marked-up version of a financial report, the financial report comprising a plurality of the narrative portions, wherein the marked-up version has been digitally-marked-up, based on a first data architecture, wherein the marked-up version of the financial report is configured in accordance with submission requirements of a regulatory entity, wherein the regulatory entity comprises one of: (a) U.S. Securities & Exchange Commission; (b) a governmental entity; or (c) a non-governmental organization, wherein the marked-up version of the financial report and the narrative portions comprise a first format that comprises the first data architecture;

based on the search, determine all occurrences of the first element name within the marked-up version of the financial report;

use the list of unique element names to search within a marked-up financial document that is related to the financial report, wherein the marked-up financial document has been digitally-marked-up based on a second data architecture, wherein: (a) the second data architecture is different from the first data architecture; (b) the marked-up financial document comprises a plurality of the detail portions; (c) the marked-up financial document and the detail portions are configured in accordance with the submission requirements; (d) the marked-up financial document and the detail portions comprise a second format that differs from the first format, the second format comprising the second data architecture; (e) the second data architecture corresponds to the different levels of detail; and (f) each of the detail portions is associated with one of the different levels of detail;

based on the search of the marked-up financial document, determine all occurrences of the first element name, wherein the marked-up financial document associates the first element name with a second piece of financial information, wherein the second piece of financial information differs, at least partially, from the first piece of financial information;

determine which one of the first and second pieces of financial information has been input most recently relative to each other;

if the first piece of financial information has been input more recently than the second piece of financial information, update the marked-up financial document by changing each occurrence of the second piece of financial information within the marked-up financial document to the first piece of financial information; and if the second piece of financial information has been input more recently than the first piece of financial information, update the marked-up version of the financial report by changing each occurrence of the first piece of financial information within the narrative portions to the second piece of financial information, wherein the system facilitates reconciliation of differences between the marked-up version of the financial report and the marked-up financial document based on changes input by one or more contributors to the financial report, and upon the step of updating the marked-up version of the financial report, the updated marked-up version of the financial report remains configured in accordance with the submission requirements.

18. The system of claim 17, wherein:

the list of unique element names comprises an engram list; and each of the marked-up version of the financial report, the updated marked-up version of the financial report, the marked-up financial document, and the updated marked-up financial document comprises a configuration that complies with the submission requirements while incorporating a plurality of the unique element names; and the submission requirements comprise a plurality of requirements of an Electronic Data Gathering, Analysis and Retrieval (EDGAR) system of the U.S. Securities & Exchange Commission.

19. The system of claim 17, wherein:

The first format comprises an HTML format;

the first data architecture comprises an HTML architecture;

the second format comprises one of an XBRL format or an XML-based format;

the second data architecture comprises one of an XBRL architecture or an XML-based architecture; and the step of changing each occurrence of the first piece of financial information to the second piece of financial information is performed regardless of whether the first piece has a word form or a numerical form.

20. The system of claim 17, wherein each one of the narrative portions comprises at least one sentence, the at least one sentence comprising a subject and a verb.

21. The system of claim 17, wherein the second piece of financial information is located within a tabular portion within the marked-up financial document.

22. The system of claim 17, wherein:

the marked-up version of the financial report comprises a first table;

a first one of the narrative portions is located adjacent to the first table within the marked-up version of the financial report;

the first narrative portion comprises the first piece of financial information; and the marked-up financial document comprises a second table, the second table comprising the second piece of financial information, wherein, if the second piece of financial information has been input more recently than the first piece of financial information, the at least one processor is operable according to the instructions to update the marked-up version of the financial report by replacing each occurrence of the first piece of financial information within the first narrative portion, with the second piece of financial information derived from the second table.

23. The system of claim 17, wherein:
the marked-up financial document comprises a tabular portion, the tabular portion comprising the second piece of financial information; and
the at least one processor is operable according to the instructions to perform a step in response to the second piece of financial information having been input more recently than the first piece of information, the step comprising updating the marked-up version of the report by replacing each occurrence of the first piece of financial information within the narrative portions to the second piece of financial information derived from the tabular portion within the marked-up financial document.

24. The system of claim 17, wherein the at least one processor is operable according to the instructions to perform the update step without requiring a user to visually search and visually discover outdated information.

25. The system of claim 17, wherein the at least one processor is operable according to the instructions to:
determine a first quantity of the occurrences of the first element name within the marked-up version of the financial report;
determine a second quantity of the occurrences of the first element name within the marked-up financial document;
if the first piece of financial information has been input more recently than the second piece of financial information, update the marked-up financial document by changing the second quantity of any and all occurrences of the second piece of financial information within the marked-up financial document, to the first piece of financial information; and
if the second piece of financial information has been input more recently than the first piece of financial information, update the marked-up version of the financial report by changing the first quantity of any and all occurrences of the first piece of financial information within the narrative portions, to the second piece of financial information.

26. The system of claim 17, wherein:
the marked-up financial document comprises a plurality of financial portions associated with the different levels of detail in accordance with the submission requirements of the regulatory entity; and
the at least one processor is operable according to the instructions to:
determine a first quantity of the occurrences of the first element name within the marked-up version of the financial report;
determine a second quantity of the occurrences of the first element name within all of the financial portions of the marked-up financial document;
if the first piece of financial information has been input more recently than the second piece of financial information, update the marked-up financial document by changing the second quantity of any and all occurrences of the second piece of financial information within all of the financial portions, to the first piece of financial information; and
if the second piece of financial information has been input more recently than the first piece of financial information, update the marked-up version of the financial report by changing the first quantity of any and all occurrences of the first piece of financial information within the narrative portions, to the second piece of financial information.

27. A method to facilitate updating of electronic financial materials for filing with a regulatory entity wherein the regulatory entity comprises one of: (a) U.S. Securities & Exchange Commission; (b) a governmental entity; or (c) a non-governmental organization, the method comprising:
accessing a list of unique element identifiers, wherein the list of unique element identifiers is associated with a plurality of narrative portions and a plurality of detail portions, wherein the detail portions are associated with a plurality of different levels of detail, wherein each of the unique element identifiers comprises mapping information that avoids name conflicts, wherein each of the unique element identifiers specifies a designated type of information, and each of the unique element identifiers is present in: (a) at least one of the narrative portions; and (b) at least one of the detailed portions associated with one of the different levels of detail, wherein the unique element identifiers comprise a first element identifier associated with a first piece of financial information;
processing the unique element identifiers to search within a report portion of a financial report, wherein the report portion is configured in accordance with a plurality of submission requirements of the regulatory entity, the report portion comprising a plurality of the narrative portions, wherein the report portion and the narrative portions comprise a first format, wherein the first format comprises a first data architecture;
based on the search, determining any occurrences of the at least one first element identifier within the report portion;
processing the unique element identifiers to search within a plurality of detail portions that are related to the financial report, wherein: (a) the detail portions comprise a second data architecture that differs from the first data architecture; (b) the second data architecture corresponds to the different levels of detail; (c) each of the detail portions is associated with one of the different levels of detail; (d) the detail portions comprise a second format that differs from the first format, the second format comprising the second data architecture; and (e) the detail portions are configured in accordance with the submission requirements;
based on the search of the detail portions, determining at least one occurrence of the first element identifier within at least one of the detail portions, wherein the at least one detail portion comprises a second piece of financial information that is associated with the first element identifier, wherein the second piece of financial information differs, at least partially, from the first piece of financial information;
determining which one of the first and second pieces of financial information has been input most recently relative to each other;
if the first piece of financial information has been input more recently than the second piece of financial information, updating the at least one detail portion by changing each occurrence of the second piece of financial information within the at least one detail portion to the first piece of financial information; and
if the second piece of financial information has been input more recently than the first piece of financial information, updating the report portion by changing each occurrence of the first piece of financial information within the narrative portions to the second piece of financial information, wherein the method facilitates reconciliation of differences between the report portion of the financial report and the detail portions based on changes input by one or more contributors to the financial report, wherein, upon completion of the step of updating the report portion, the report portion is configured in accordance with the submission requirements.

28. The method of claim 27, wherein:
the first format comprises an HTML format;
the first data architecture comprises an HTML architecture;
the second format comprises one of an XBRL format or an XML-based format; and
the second data architecture comprises one of an XBRL architecture or an XBRL architecture.

29. The method of claim 28, wherein:
at least one of the detail portions comprises at least one tabular section, wherein the at least one tabular section comprises a row section and a column section; and
the first element identifier specifies a location for information, wherein the location is specified by an intersection of the row section with the column section of the at least one detail portion.

30. The method of claim 27, comprising:
executing a plurality of computer-readable instructions to incorporate the unique element identifiers into at least one of the narrative portions and at least one of the detail portions.

31. The method of claim 30, wherein the detail portions and the report portion remain in compliance with the submission requirements of the regulatory entity even when the at least one narrative portion and the at least one detail portion incorporate the first element identifier.

32. The method of claim 27, wherein the accessing, the processing, the determining, and the updating steps are electronically performed by at least one processor according to computer-readable instructions.

33. The method of claim 27, wherein the first element identifier comprises: (a) information corresponding to a unique identifier; and (b) a numerical fact associated with a topic, wherein the unique identifier is present within: (i) a sentence of one of the narrative portions; and (ii) a table of one of the detail portions.

34. The method of claim 33, wherein: the sentence comprises a subject and a verb;
the table comprises at least one row and at least one column;
the unique identifier specifies positional information related to a location of the numerical fact within the table, wherein the positional information comprises an intersection of the at least one row with the at least one column.

35. The method of claim 27, wherein:
the submission requirements comprise a plurality of requirements of an Electronic Data Gathering, Analysis and Retrieval (EDGAR) system of the U.S. Securities & Exchange Commission.

36. The method of claim 27, wherein the updating step occurs without requiring a user to visually search and visually discover outdated information.

* * * * *